United States Patent
I et al.

(10) Patent No.: US 7,418,946 B2
(45) Date of Patent: Sep. 2, 2008

(54) ENGINE START CONTROL APPARATUS AND METHOD

(75) Inventors: Sunki I, Hwa-sung (KR); Hajime Yasuda, Tokyo (JP); Kimiyoshi Nishizawa, Yokohama (JP); Kenichi Satou, Yokohama (JP); Daisuke Yoshioka, Yokohama (JP); Kouichi Mori, Ayase (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/880,878

(22) Filed: Jul. 24, 2007

(65) Prior Publication Data
US 2008/0022958 A1 Jan. 31, 2008

(30) Foreign Application Priority Data
Jul. 25, 2006 (JP) ............... 2006-201784
Aug. 30, 2006 (JP) ............... 2006-233406

(51) Int. Cl.
*F02P 5/15* (2006.01)
(52) U.S. Cl. ............... 123/406.45; 123/406.47; 123/406.53; 123/491; 123/179.16; 123/179.18
(58) Field of Classification Search ............ 123/406.45, 123/406.47, 406.53, 491, 179.16, 179.18
See application file for complete search history.

(56) References Cited

U.S. PATENT DOCUMENTS

| | | | |
|---|---|---|---|
| 6,845,749 B2 * | 1/2005 | Kubo ............... | 123/406.45 |
| 6,966,299 B2 * | 11/2005 | Miyamoto et al. ..... | 123/406.45 |
| 7,032,572 B2 * | 4/2006 | Bidner et al. ......... | 123/406.47 |
| 2003/0221671 A1 * | 12/2003 | Bidner et al. ......... | 123/406.47 |
| 2004/0163624 A1 * | 8/2004 | Meyer ................ | 123/406.47 |
| 2004/0226283 A1 * | 11/2004 | Meyer ................ | 123/406.53 |
| 2006/0065235 A1 * | 3/2006 | Tomita et al. ......... | 123/406.47 |

FOREIGN PATENT DOCUMENTS

| | | |
|---|---|---|
| JP | 8-232645 | 9/1996 |
| JP | 2003-314347 | 11/2003 |

* cited by examiner

*Primary Examiner*—Erick Solis
(74) *Attorney, Agent, or Firm*—Osha Liang LLP

(57) ABSTRACT

An engine start control apparatus includes an intake air amount control device for controlling an amount of air supplied to a combustion chamber, a fuel supply device for injecting fuel to be fed into the combustion chamber, and an igniting device for igniting the fuel. The engine start control apparatus further includes an engine operation state detecting unit for detecting an operation state of the engine, an ignition timing retard angle processing unit configured to retard an ignition timing from a start ignition timing to an ignition timing for catalyst warming-up acceleration in response to detection that the engine operation state has shifted to an idling operation state, an intake control device operation unit for operating an intake control device so as to supply such an amount of intake air as to keep the idling operation state when the engine operation state has shifted to the idling operation state, and an injection fuel amount increasing unit for increasing an amount of fuel injected into a cylinder to be shifted to a combustion stroke so as to be combusted in the combustion stroke when the engine operation state has shifted to the idling operation state.

25 Claims, 25 Drawing Sheets

ENGINE START CONTROL APPARATUS AND METHOD

PRIORITY APPLICATION

This application claims priority from Japanese Patent Application Nos. 2006-233406, filed Aug. 30, 2006, and 2006-201784, filed Jul. 25, 2006, the contents of which are hereby incorporated by reference in their entireties.

BACKGROUND OF INVENTION

1. Field of the Invention

The present invention relates to an apparatus and method for controlling starting of an engine.

2. Description of the Related Art

In a cold start of the engine, meaning that the engine and other components are not still warm from previous use, a catalyst is in an inactive state since its temperature is low and is incapable of purifying an exhaust gas. In this situation, it is important to activate the catalyst in order for the catalyst to begin to purify the exhaust gas.

Japanese Patent Application Laid-Open (JP-A) No. 8-232645 discloses a technique for activating the catalyst after the engine is started. In the technique, in the cold start situation, an ignition timing is set at a start ignition timing until the engine is started by cranking and the engine fires. After the engine fires, the ignition timing is quickly retarded to a predetermined ignition timing after the compression top dead point, whereby the temperature of an exhaust gas is raised to quickly activate the catalyst. Further, an idling control valve is opened wide before the ignition timing retardation to thereby increase the amount of intake air, and after the ignition timing retardation, the amount of the intake air is further increased to smoothly and quickly fire the engine.

The technique of JP-A-8-232645 causes the engine to smoothly and quickly fire, but the engine rotation speed exceeds a target idling rotation speed. This reduces the fuel economy because more fuel is consumed at the higher engine rotation speed.

SUMMARY OF THE INVENTION

In accordance with embodiments of the present invention, an engine start control apparatus includes an intake air amount control device for controlling an amount of air supplied to a combustion chamber, a fuel supply device for injecting fuel to be fed into the combustion chamber, and an igniting device for igniting the fuel. The engine start control apparatus further includes an engine operation state detecting unit for detecting an operation state of the engine, an ignition timing retard angle processing unit for operating the igniting device configured to retard an ignition timing from a start ignition timing to an ignition timing for catalyst warming-up acceleration in response to detection that the engine operation state has shifted to an idling operation state, an intake control device operation unit for operating an intake control device so as to supply such an amount of intake air as to keep the idling operation state when the engine operation state has shifted to the idling operation state, and an injection fuel amount increasing unit for increasing an amount of fuel injected into a cylinder to be shifted to a combustion stroke so as to be combusted in the combustion stroke when the engine operation state has shifted to the idling operation state.

In accordance with embodiments of the present invention, an engine start control method includes retarding an ignition timing when an engine rotation speed at start of the engine reaches a target idling rotation speed, opening an intake throttle before the retarding of the ignition timing by a response delay period from when an intake throttle opens until air reaches a combustion chamber of the engine, and increasing an amount of fuel injected into a cylinder expected to be in a combustion stroke when the start engine rotation speed reaches the target idling rotation speed, and in the exhaust stroke immediately before the start engine rotation speed reaches the target idling rotation speed.

In accordance with embodiments of the present invention, even in the cold start situation, after the complete ignition, the engine rotation speed swiftly settles down to the target rotation speed at the time of idling.

Other aspects and advantages of the invention will be apparent from the following description and the appended claims.

DETAILED DESCRIPTION

In general, embodiments of the present invention relate to an engine start control apparatus and method which, in the cold start situation, swiftly shifts an engine operation state to an idling operation state after the complete ignition while accelerating the warming-up of the engine, and after the idling operation state is set up, sets an operation state providing a stable air fuel ratio.

Figure 1:
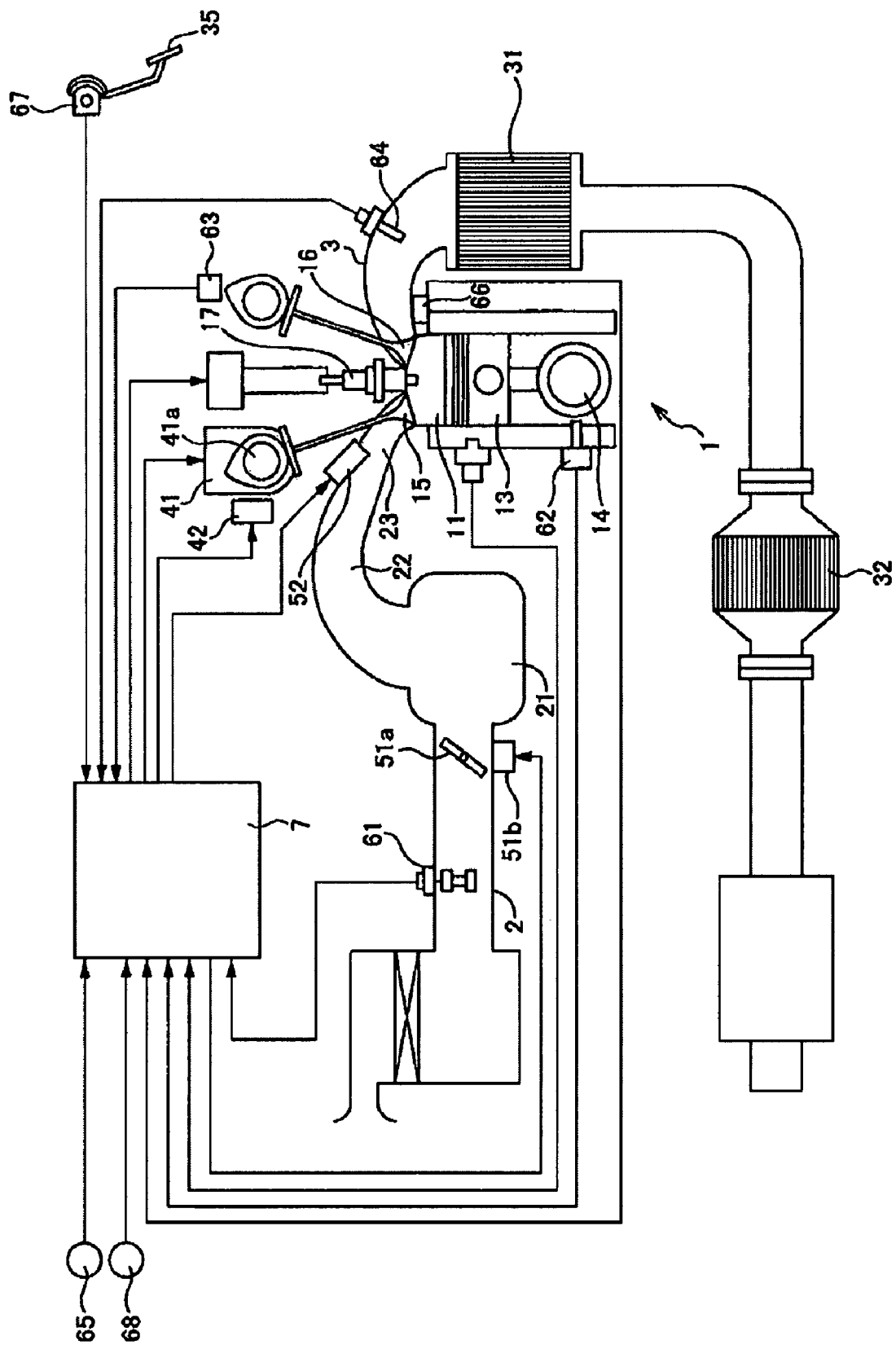
FIG. 1 is a diagram schematically showing an arrangement of an engine start control apparatus according to a first embodiment of the present invention.

FIG. 1 is a diagram schematically showing an arrangement of an engine start control apparatus according to a first embodiment of the present invention.

An intake throttle device 51 as intake control means and a fuel injection valve 52 as fuel supply means are installed in an intake air passage 2 of an engine 1, including an intake air collector 21. The intake throttle device 51 includes an intake throttle 51a and a throttle motor 51b. When a driver presses on an acceleration pedal 35, a controller 7 as control means determines a target torque in accordance with a signal from an accelerator position sensor 67, determines a target amount of air to attain the target torque, and controls a degree of opening of the intake throttle 51a with the aid of the throttle motor 51b so as to obtain the target air amount. When receiving a torque request signal for constant speed traveling by an auto speed control device (ASCD) and a torque request signal for the rotation synchronization control to ease gear shift shock by the automatic transmission, the controller 7 determines a target air amount to attain the target torque and controls a degree of opening of the intake throttle 51a with the aid of the throttle motor 51b so as to obtain the target air amount. The intake throttle device 51 is not mechanically connected to the acceleration pedal 35, and the throttle motor 51b drives the intake throttle 51a.

An exhaust passage 3 is provided with a manifold catalyst 31 and an underfloor catalyst 32. The manifold catalyst 31 and the underfloor catalyst 32 are each a three-way catalyst capable of simultaneously removing hydrocarbon (HC), carbon monoxide (CO) and nitrogen oxide (NOx) when the air fuel ratio of the exhaust gas is within a narrow range with respect to the theoretical air fuel ratio. Accordingly, the controller 7 determines a basic fuel injection amount of the fuel from the fuel injection valve 52 on the basis of operation conditions, and controls the air fuel ratio according to a signal from a $O_2$ sensor 64 located upstream of the manifold catalyst 31 in a feedback manner.

The engine 1 includes a variable valve event and lift control system (referred to as "VEL mechanism") 41 and a valve timing control (referred to as "VTC mechanism") 42. The VEL mechanism 41 is constructed with a multinodular-link mechanism to continuously vary a lift quantity and an operation angle of an intake valve 15. The VTC mechanism 42 continuously varies a rotation phase difference between a crank shaft 14 and an intake-valve cam shaft 41a to advance and retard a valve timing of the intake valve 15.

The amount of air is controlled by the intake throttle 51a and is stored in the intake air collector 21. The air is introduced into respective cylinders 11 through an intake manifold 22. The fuel is intermittently injected from the fuel injection valves 52 located at intake ports 23 of the cylinders to the intake ports 23 at predetermined timings. The controller 7 calculates an amount of fuel fed to the fuel injection valve 52 by using an intake air flow rate detected by an air flow meter 61 (air flow-rate detecting means) and an engine rotation speed calculated by using a signal from crank angle sensors (33, 34).

The injected fuel is mixed with the intake air to form an air-fuel mixture, which is confined in each cylinder 11 when the intake valve 15 is closed, compressed through the lifting of a piston 13, and ignited with an ignition plug 17 to be combusted. A gas pressure generated by the combustion presses down the piston 13. The reciprocal motion of the piston 13 is converted into a rotary motion of the crank shaft 14. Gas (exhaust gas) after the combustion is exhausted to the exhaust passage 3 when an exhaust valve 16 is opened.

The first catalyst 31 (start-up catalyst) is installed at the manifold aggregate of the exhaust passage 3, and the second catalyst 32 is positioned at the underfloor of the vehicle. Those two catalysts 31 and 32 are each a three-way catalyst. The three-way catalyst is capable of simultaneously removing HC, CO, and NOx when the air fuel ratio of the exhaust gas is within a narrow range with respect to the theoretical air fuel ratio. The controller 7, which receives a signal indicative of an intake air amount output from the air flow meter 61 and a signal from a crank angle sensor 62 (position sensor 33 and phase sensor 34), determines the basic fuel injection amount of the fuel from the fuel injection valve 52 according to those signals, and controls the air fuel ratio according to a signal from a $O_2$ sensor 64 located upstream of the manifold catalyst 31 in a feedback manner.

In the cold start situation, to perform the feedback control of the air fuel ratio by early activating the $O_2$ sensor 64 as well as the catalyst, the controller swiftly increases the temperature of the $O_2$ sensor 64 immediately after the start of the engine. Upon receipt of a signal from the $O_2$ sensor 64, the controller performs the feedback control of the air fuel ratio at the timing of activating the $O_2$ sensor 64.

The catalysts 31 and 32 may be used in any other suitable way. For example, the engine may be operated at a lean air fuel ratio, rather than the theoretical air fuel ratio. In an operation region of a low-load side to improve fuel consumption after the warming-up of the engine, an NOx trap catalyst may be used for the second catalyst 32 in order to absorb NOx, which is generated in greater amounts during the lean operation of the engine. The NOx trap catalyst may have a three-way catalyst function.

The controller 7 contains a microcomputer including a central processing unit (CPU), a read only memory (ROM), a random access memory (RAM), and an input/output interface (I/O interface). An engine controller 50 may contain a plurality of microcomputers.

As described above, in the prior art, in the cold start situation, the ignition timing is set at a start ignition timing until the engine is completely ignited by the cranking and the engine fires. After the engine fires, the ignition timing is quickly retarded to a predetermined ignition timing following the compression top dead point, whereby the temperature of the exhaust gas is raised to quickly activate the catalyst.

Further, the idling control valve is opened wide before the ignition timing retardation to thereby increase the amount of intake air, and after the ignition timing retardation, the intake air amount is further increased to smoothly and quickly ignite the engine. In the prior art, the engine smoothly and quickly fires, but the engine speed reaches then exceeds the target idling rotation speed. Accordingly, the fuel is wastefully consumed, which reduces the fuel economy.

Fuel economy would be improved if the engine operation state after ignition shifts to the idle operation state as soon as possible and is settled down to the target idling rotation speed. A preferable engine operation state, for example, is such that when an engine rotation speed is detected, the engine rotation speed swiftly settles down to the target idling rotation speed without excessively exceeding the target idling rotation speed thereafter.

To achieve an ideal engine rotation speed, the inventors of the present application reached the following technical idea. The ignition timing is quickly retarded from the start ignition timing to a predetermined ignition timing after the compression top dead point when the engine rotation speed reaches the target idling rotation speed. In addition, prior to the retardation of the ignition timing, the intake throttle is opened before the engine rotation speed reaches the target idling rotation speed, allowing for a response delay from the opening of the intake throttle until the intake air arrives at the combustion chamber.

With such a technical idea, the engine rotation speed swiftly settles down to the target idling rotation speed without exceeding the target idling rotation speed, and is kept at the target idling rotation speed.

The following defect has been confirmed, however. After reaching the target idling rotation speed, the engine rotation speed settles down to the target idling rotation speed and is kept at the target idling rotation speed, but the air fuel ratio exceeds the stable combustion limit and becomes lean. If the air fuel ratio is within a narrow range, called a window, which extends with respect to the theoretical air fuel ratio, the three-way catalyst having undergone the warming-up operation is capable of simultaneously removing HC, CO, and NOx. If the air fuel ratio is too lean and outside the window, the cleaning performance of the catalyst degrades and the amount of exhausted HC increases.

Embodiments of the present invention increase the amount of fuel injected at a proper timing so as to prevent the air fuel ratio from becoming lean.

Operations of an engine start control apparatus, which is an embodiment of the present invention, will be described with reference to a timing chart shown in FIG. 7. Step numbers will each be attached with letter S for clarifying relationships between the details of the description to be given and flow charts. For illustrative, non-limiting purposes, the timing chart provided in FIG. 7 is for a four-cylinder engine.

Figure 7:
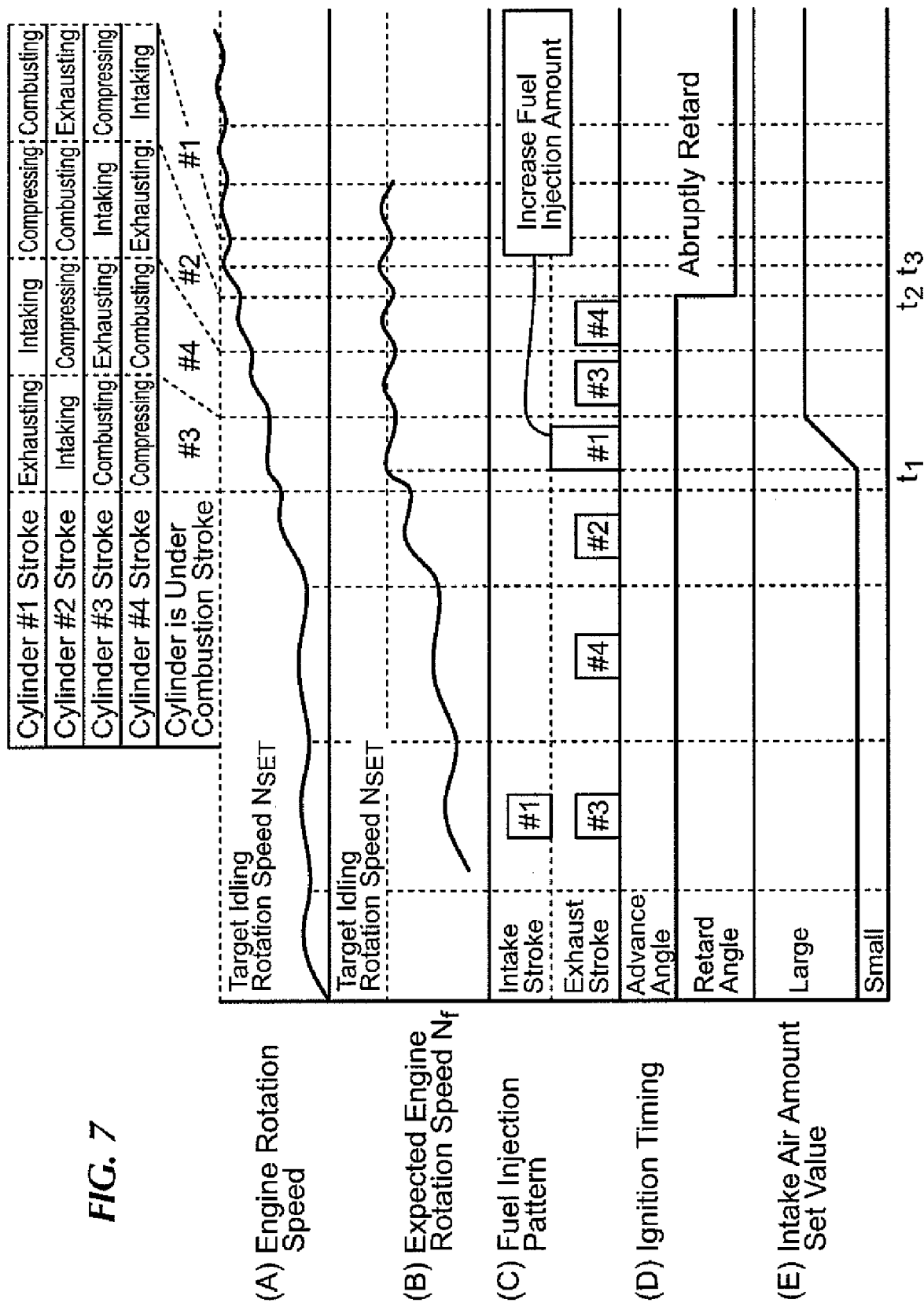
FIG. 7 is a timing chart showing operations of the engine start control apparatus according to the first embodiment.

An expected engine rotation speed Nf is less than a target idling rotation speed NSET until a time point t1 in FIG. 7. In step S15 in FIG. 5, an after-start fuel-increase correction coefficient KAS is set at the previous value and a normal amount of fuel is injected into the cylinders in the order of #3→#4→#2.

When the expected engine rotation speed Nf reaches the target idling rotation speed NSET at time point t1, the after-start fuel-increase correction coefficient KAS is set according to a characteristic map. Thereby, an amount of fuel injected to the cylinder #1 is increased.

Figure 5:
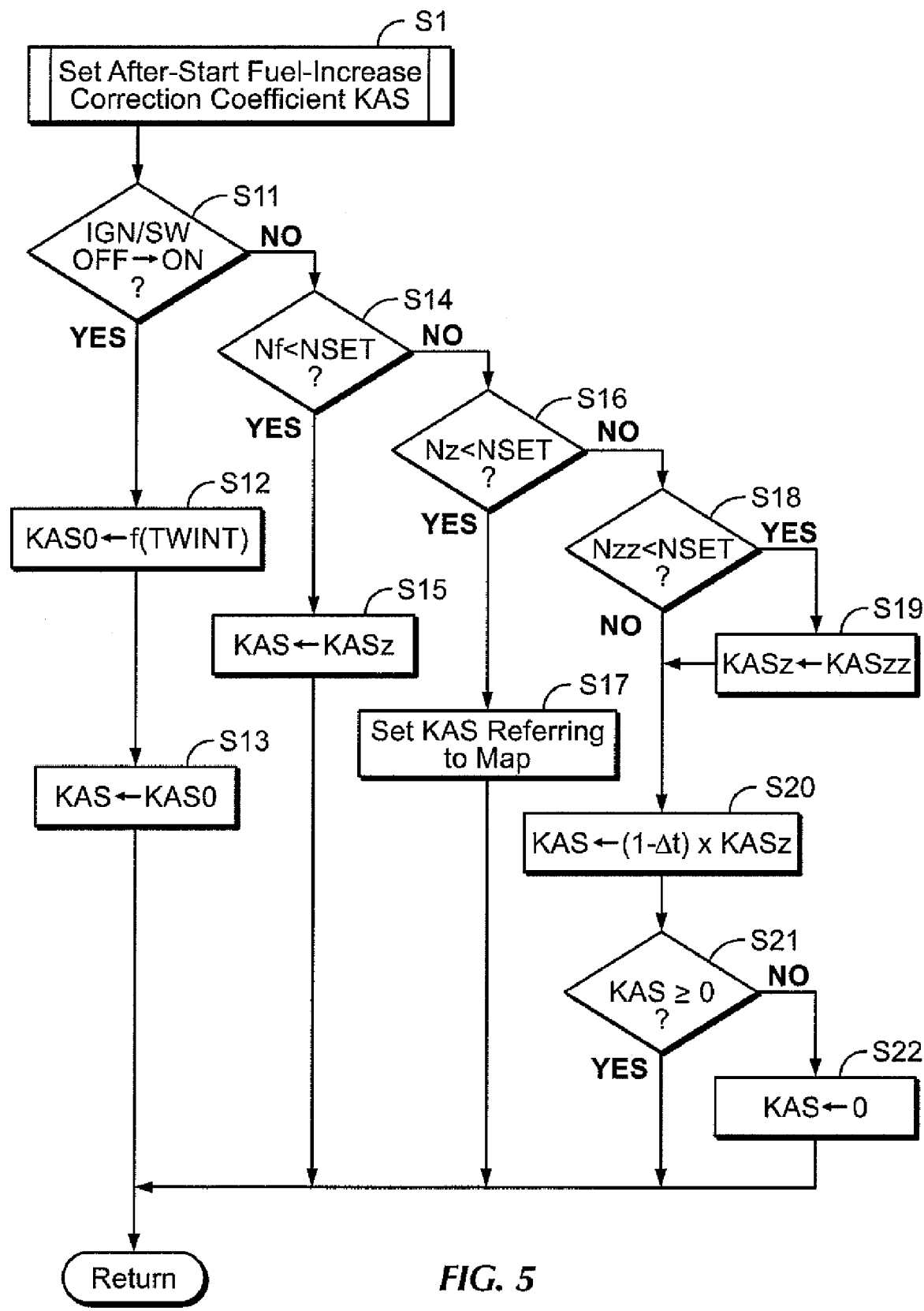
FIG. 5 is a flow chart showing a calculation routine for calculating an after-start fuel-increase correction coefficient KAS in the first embodiment.

In the next cycle, in step S19 in FIG. 5, a two-times ago value KASzz of the after-start fuel-increase correction coefficient for two times ago is set at the previous value KASz of the after-start fuel-increase correction coefficient, the increased fuel resumes the original amount of the fuel, and the normal amount of the fuel is injected into the cylinder #3. The ignition timing is quickly retarded from the ignition timing of the cylinder #1. Calculation of after-start fuel-increase correction coefficients is discussed in greater detail below with respect to FIG. 5.

In the present invention, through the control stated above, the ignition timing is quickly retarded from the start ignition timing to a predetermined ignition timing after the compression top dead point when the engine rotation speed reaches the target idling rotation speed (time point t2 in FIG. 7). Further, prior to the retardation of the ignition timing, the intake throttle is opened before the engine rotation speed reaches the target idling rotation speed, allowing for a response delay from the opening of the intake throttle to the arrival of the intake air at the combustion chamber (time point t1 in FIG. 7). At about the same time, the amount of the fuel injected to the cylinder #1 is increased, as shown in FIG. 7.

In this way, when the engine rotation speed reaches the target idling rotation speed (time point t3 in FIG. 7), the engine rotation speed can be kept at the target idling rotation speed without substantially exceeding the target idling rotation speed.

The value of the air fuel ratio is equal to or near the value of the theoretical air fuel ratio, the three-way catalyst can clean the exhaust gas, and the amount of the HC does not increase.

The operations of the engine start control apparatus described above will be described in more detail with reference to a flow chart shown in FIG. 8. A control of the engine start control apparatus of a comparative example when the control of the present embodiment is not performed will be described to clarify the effects of the first embodiment.

At time point t0, a starter switch 65 (FIG. 1) is turned on to start the engine. The controller starts to open the intake throttle at time t1 allowing for a response delay from the opening of the intake throttle until the intake air reaches the combustion chamber (one dot chain line in section B of FIG. 8). As indicated by one dot chain line in section C of FIG. 8, the controller quickly retards the ignition timing from a first ignition timing ADV1 to a second ignition timing ADV2 at time point t2 at which the engine rotation speed reaches the target idling rotation speed NSET.

If so controlled, after time point t2, the engine rotation speed is kept at the target idling rotation speed NSET (indicated by a solid line in FIG. 8A). Accordingly, there is no chance that the engine rotation speed will exceed the target idling rotation speed NSET and the engine is not blown up, so that wasteful fuel consumption is suppressed to improve fuel economy.

Figure 8:
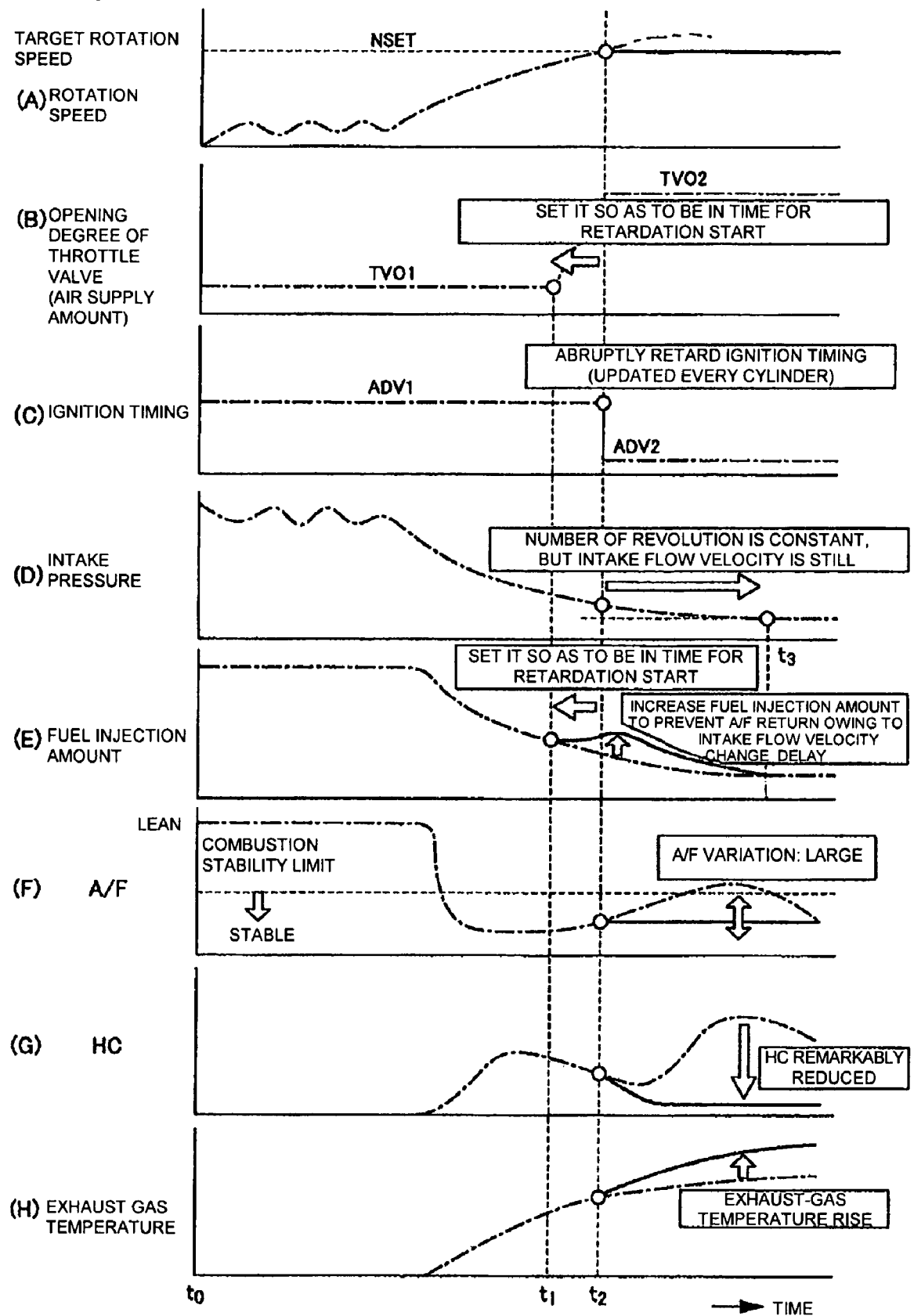
FIG. 8 is a timing chart useful in explaining the effects of the engine start control apparatus of the first embodiment.

When the control is viewed in terms of the air fuel ratio, the air fuel ratio is close to the theoretical air fuel ratio at time point t2 as indicated by one dot chain line in section F of FIG. 8, and subsequent to the time point, the air fuel ratio exceeds a combustion stability limit to be lean. The amount of the exhausted HC increases as indicated by one dot chain line in FIG. 8G.

The inventors of the present application made much efforts to inquire into the cause of the phenomenon. The result shows that fuel flowing along an inner wall of the intake port (wall-flow fuel) gives rise to the phenomenon. The wall-flow fuel will be briefed below. The fuel is intermittently injected to the intake port at predetermined timings, from the fuel injection valve 52. The fuel thus injected is not entirely injected into the combustion chamber in the initial stage of cold start. Part of the fuel attaches to the inner wall of the intake port 23 and the valve head back part of the intake valve 15, flows in the form of liquid along the port wall, and then is absorbed into the combustion chamber. As a result, a delay occurs in the fuel supply to the combustion chamber. Such a fuel is the wall-flow fuel.

To cope with the wall-flow fuel, as indicated by one chain line in FIG. 8E, an excessive amount of fuel is injected in the initial stage of the cold start situation in which fuel wall-flow amount is significant along the wall of the intake port. The fuel injection amount is gradually decreased when less fuel contributes to the wall-flow amount of fuel.

The experiment conducted by the inventors showed that after time point t2 at which the engine rotation speed Ne reached the target idling rotation speed NSET, the intake air pressure and the intake flow velocity were changing as shown in section D of FIG. 8, even when the engine rotation speed was fixed.

The fuel wall-flow amount on the intake port wall depends on the pressure at the portion where the wall-flow fuel flows (i.e., intake pressure) and the intake flow velocity at the portion where the wall-flow fuel flows (i.e., intake flow velocity in the intake port 23). From this fact, the inventors found that the fuel wall-flow has a characteristic that the lower the intake pressure is, the smaller the fuel wall-flow is (caused by the fact that the lower the intake pressure is, the better the vaporizing characteristic becomes). Another characteristic is that the higher the intake flow velocity of the intake port 23 is, the smaller the fuel wall-flow is (caused by the fact that the higher the intake flow velocity of the intake port 23 is, the better the vaporizing characteristic becomes). The fuel wall-flow amount at time point t3 when the intake pressure and the intake flow velocity in the intake port converge into predetermined values (those vary as in the sequent normal variation fashion and are in a stable state) is less than the fuel wall-flow at time point t2 at which the intake pressure and the intake flow velocity of the intake port are varying. The amount of the fuel flowing into the cylinder 11 also contains the fuel wall-flow amount. For this reason, the fact that the fuel wall-flow amount continuously decreases during the time period between time points t2 and t3 means that the amount of the fuel flowing into the cylinder 11 also continuously decreases with the decrease of the fuel wall-flow amount. Accordingly, even if the air fuel ratio of the air-fuel mixture is the theoretical air fuel ratio at time point t2, the actual air fuel ratio shifts in value toward the lean side with the decrease of the fuel wall-flow amount and shifts beyond the combustion stability limit to finally be lean.

The prior art has not taken into consideration the variations of the intake pressure and the intake flow velocity of the intake port as just mentioned, and hence, fail to provide a successful solution to the problem of the poor fuel wall-flow amount and the lean air-fuel ratio.

In the present embodiment, as described above, the controller determines a cylinder expected to be in excess of the target idling rotation speed NSET, and increases the amount of the fuel injected to the cylinder in advance. Such a control enables the air fuel ratio to be kept at a value near the theoretical air fuel ratio even after the engine rotation speed has been kept at the target idling rotation speed NSET (solid line in section F of FIG. 8). This leads to a reduction of the amount of the exhausted HC from the three-way catalyst (solid line in section G of FIG. 8).

This control to be executed by the engine controller 7 will be described in detail with reference to the following flow charts.

Figure 2:
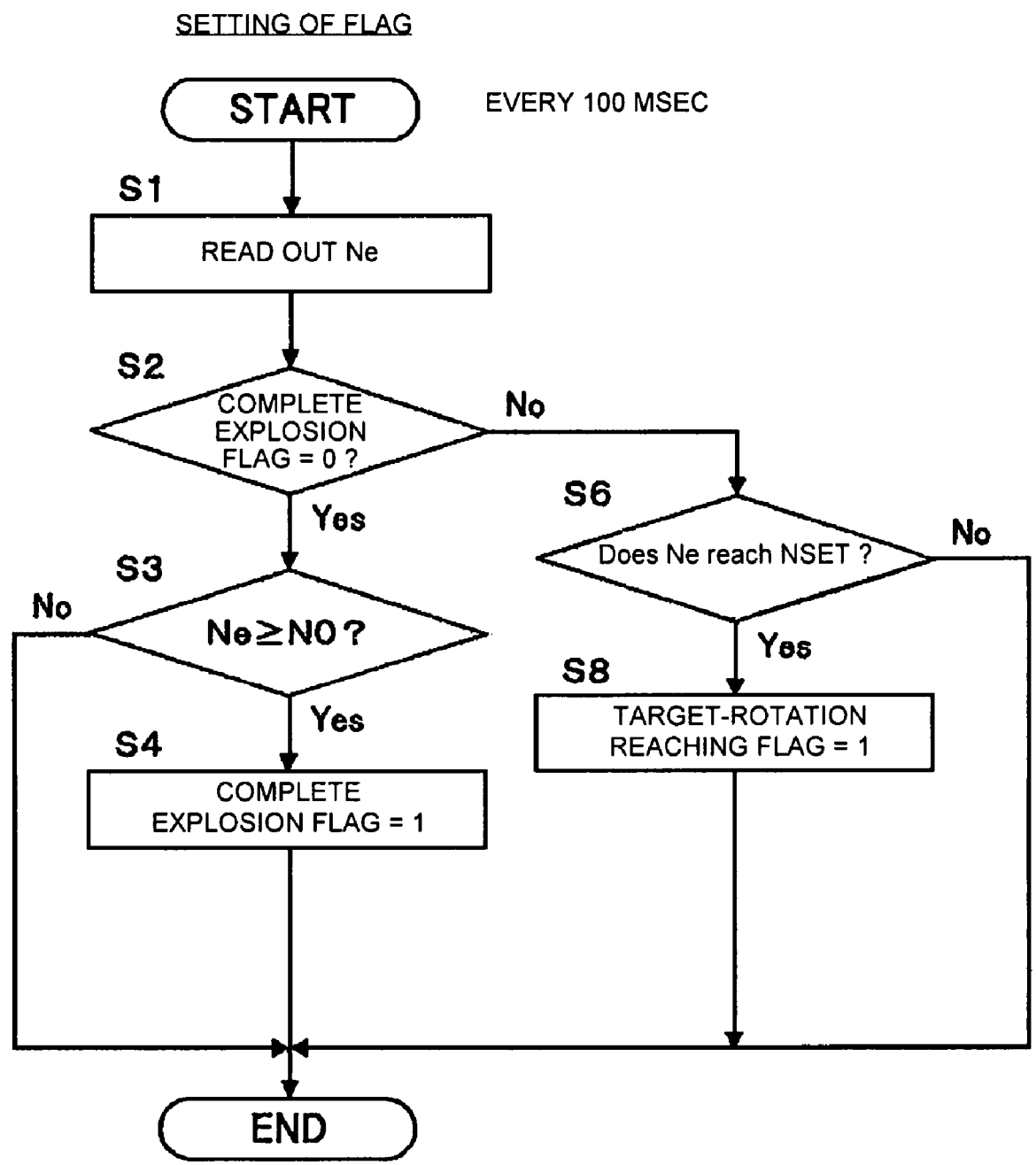
FIG. 2 is a flow chart for setting a complete explosion flag and a target-rotation reaching flag in the first embodiment.

FIG. 2 is a flow chart for setting a complete explosion flag and a target-rotation reaching flag in the first embodiment. The program of the flow chart is executed at fixed time intervals (e.g., 100 ms).

In FIG. 2, the controller reads an engine rotation speed Ne in step S1. The engine rotation speed Ne is calculated from a signal output from the crank angle sensor 62 (33, 63).

The controller checks the complete explosion (alternatively referred to as "ignition") flag in step S2. The complete explosion flag is initially set to be zero when an ignition switch 68 is changed from an off state to an on state. Initially, the complete explosion flag=0, and the controller advances from step S2 to step S3 where the controller compares the engine rotation speed Ne with the complete-explosion rotation speed N0 (e.g., 1000 rpm). The complete-explosion rotation speed N0 takes an adaptive value. If the engine rotation speed Ne does not reach the complete-explosion rotation speed N0, the controller ends the flag setting process.

When the engine rotation speed Ne reaches the complete-explosion rotation speed N0 (Ne≧N0) in step S3, the controller advances to step S4 where the controller sets the complete explosion flag to 1 (complete explosion flag=1) to show that the engine rotation speed has reached the complete-explosion rotation speed N0.

When the complete explosion flag=1, the controller proceeds from step S2 to step S6 from the next time. In step S6, the controller determines whether or not the engine operation state has reached the idling operation state. In this embodiment, the engine rotation speed is used as a determination parameter for means for detecting an engine operation state, and the controller determines whether or not the engine rotation speed Ne reaches a target idling rotation speed NSET (e.g., 1200 rpm) in a predetermined idling operation state.

If the answer is YES, the controller proceeds to step S8. In the step, the controller sets the target-rotation reaching flag (is initialized to zero when the ignition switch is switched from an off state to an on state) to "1" (target-rotation reaching flag=1) in order to show that the target rotation speed NSET at the time of idling is reached. In this embodiment, the controller determines the timing at which the engine rotation speed Ne reaches the target rotation speed NSET in the predetermined idling operation state. In an alternative, it is determined whether or not the engine rotation speed Ne reaches the target rotation speed NSET.

Figure 3:
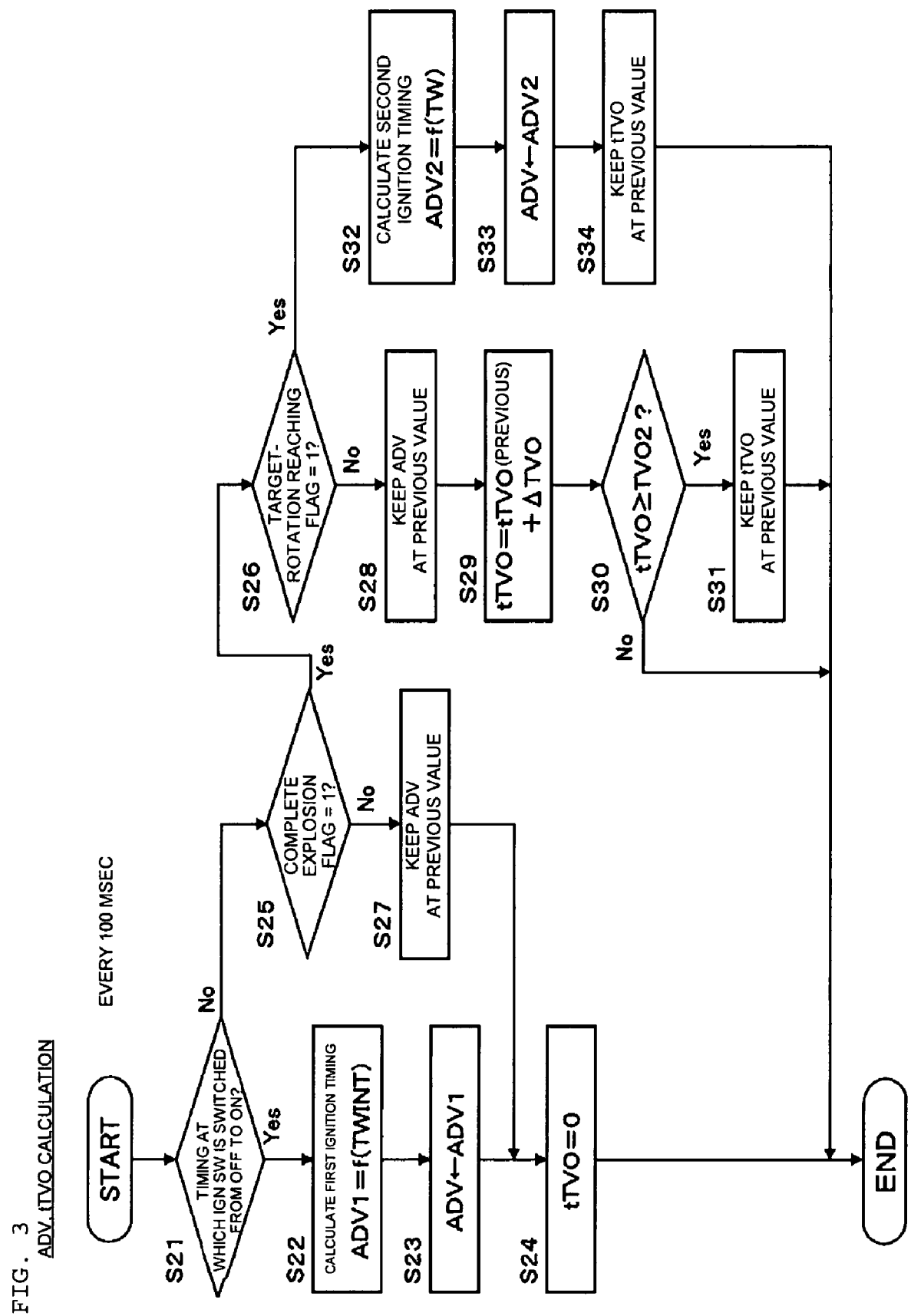
FIG. 3 is a flow chart for calculating an ignition timing command value and a throttle-valve target opening-degree in the first embodiment.

FIG. 3 is a flow chart for calculating an ignition timing command value and a throttle-valve target opening-degree. This program is executed at fixed time intervals (e.g., every 100 ms), following the program of the flow chart of FIG. 2.

In FIG. 3, in step S21, the controller checks whether or not the timing at which the ignition switch is switched from off-state to on-state is reached. If the time is reached, the controller advances to step S22. The controller reads a cooling water temperature Tw detected by a water temperature sensor 66 as an at-start water temperature TWINT, calculates a first ignition timing ADV1 using the at-start water temperature TWINT, and sets the first ignition timing ADV1 as an ignition timing command value ADV in step S23. The first ignition timing ADV1 is an ignition timing most suitable for the engine start, which is time positioned much closer to the advance side than the ignition timing set at the time of catalyst warming-up.

In step S24, the controller sets an initial value (e.g., zero) to a throttle-valve opening degree tTVO.

After the ignition switch is switched from the off-state to the on-state, the controller advances from step S21 to step S25 and step S26. In those steps S25 and S26, the controller checks the complete explosion flag and the target-rotation reaching flag (both the flags have been set in the program of FIG. 2). When complete explosion flag=0, the controller advances to step S27 where the controller keeps the first ignition timing ADV1 calculated when the ignition switch is switched from the off-state to the on-state. Also at this time, the operation in step S24 is executed.

When complete explosion flag=1 and target-rotation reaching flag=0, the controller advances from step S26 to step S28 where the controller keeps the first ignition timing ADV1 calculated when the ignition switch is switched from the off-state to the on-state.

In step S29, the controller computes a throttle-valve opening degree tTVO by using the following equation:

Equation 1 $tTVO=tTVO(previous)+\Delta TVO$ (1)

where $\Delta TVO$ is a constant value; and tTVO (previous) is a previous value of tTVO $\Delta TVO$ in the equation (1) represents a value defining an increment of the throttle-valve opening degree per predetermined time. The value of $\Delta TVO$ is preset so that the throttle-valve opening degree tTVO reaches a predetermined value TVO2 when the engine rotation speed Ne reaches the target rotation speed NSET at the time of idling. The manner in which the value TVO2 is predetermined is described in greater detail below. The initial value of the "tTVO (previous)" as the previous value of the throttle-valve opening degree is set at zero.

In step S30, the controller compares the throttle-valve opening degree tTVO with the predetermined value TVO2. The predetermined value TVO2 indicates an opening degree of the throttle valve when the least amount of the intake air necessary for generating a torque to keep the target rotation speed NSET flows. The predetermined value TVO2 is obtained by the adaptation in advance.

After the controller first executes the process of step S29 in the current engine operation, the throttle-valve opening degree tTVO is less than the predetermined value TVO2. Accordingly, the controller ends the current process. The controller repeats the process of step S29 until the target-rotation reaching flag is set to 1. The throttle-valve opening degree tTVO gradually increases. The throttle-valve opening degree tTVO increases to be in excess of TVO2 immediately before target-rotation reaching flag=1. At this time, the controller advances from step S30 to step S31, and keeps the throttle-valve opening degree tTVO at the same value as the previous one.

When target-rotation reaching flag=1, the controller advances from step S26 to step S32. The controller calculates a second ignition timing ADV2 using a cooling water temperature Tw at that time, detected by the water temperature sensor 66 (FIG. 1), and sets it as the ignition timing command value ADV in step S33.

The second ignition timing ADV2 is an ignition timing for accelerating the warming-up of the first catalyst 31, and is time positioned closer to the retardation angle side than the ignition timing after the warming up of the first catalyst 31 is completed. Therefore, the ignition timing stepwise changes from the first ignition timing ADV1 to the second ignition timing ADV2 at time point t2 when the engine rotation speed Ne reaches the target rotation speed NSET as shown on the second line in FIG. 3.

In step S34, the controller keeps the throttle-valve opening degree tTVO at the same value as the previous one (=TVO2).

The ignition timing command value ADV thus calculated is loaded into an output shift register. A primary side current of an ignition coil is shut off at the time point when an actual crank angle is coincident with the ignition timing command value ADV.

The throttle valve driving device, which receives the throttle-valve opening degree tTVO, drives the throttle motor 51b so that the actual throttle valve opening degree is about equal to the throttle-valve opening degree tTVO.

Figure 4:
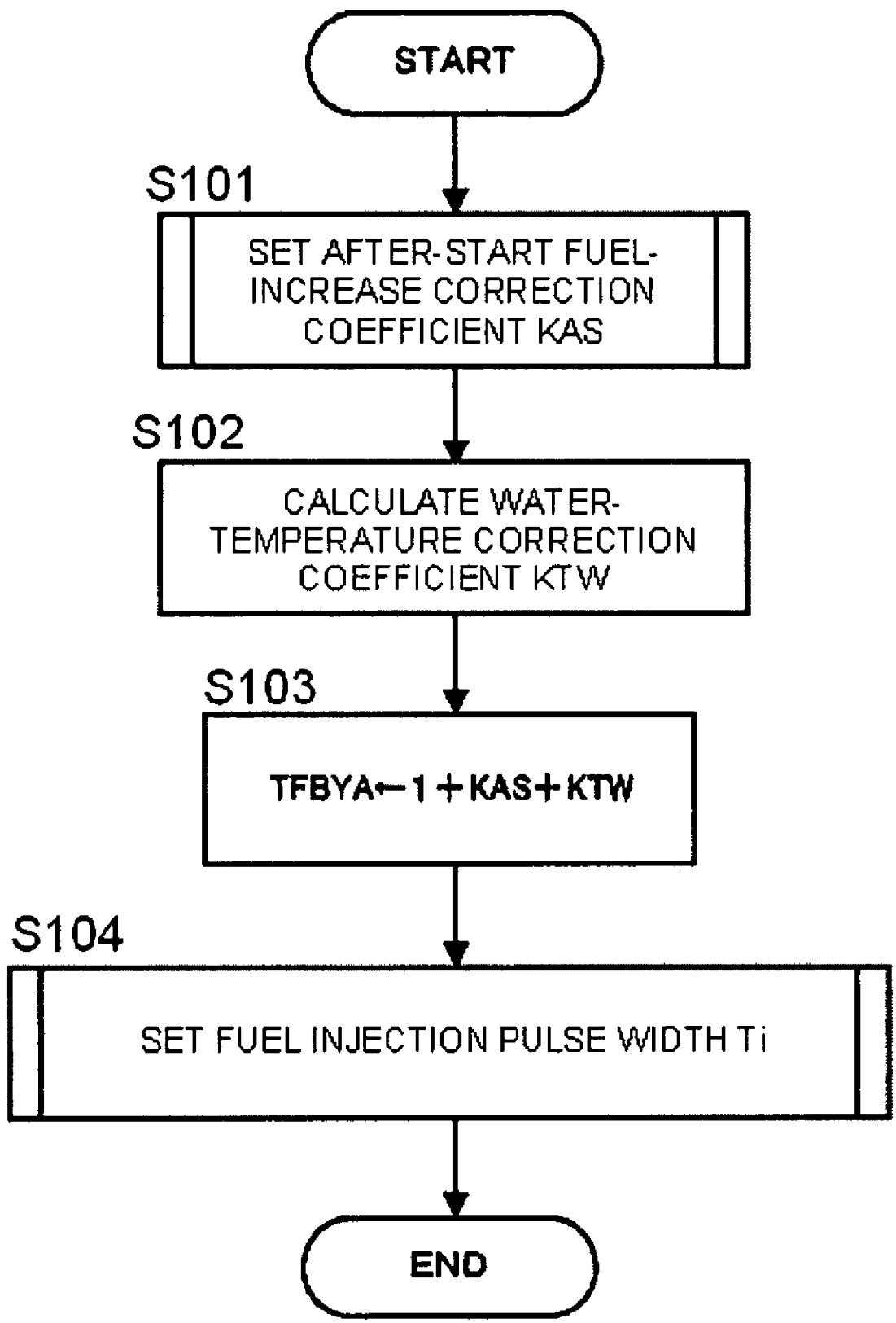
FIG. 4 is a flow chart showing a fuel-increase control logic.

A specific control logic of the fuel injection amount increase control by the controller 7 will be described with reference to a flow chart shown in FIG. 4. The control logic is executed at fixed time intervals (e.g., every 100 ms) according to the following flow chart.

In step S101, the controller 7 sets an after-start fuel-increase correction coefficient KAS. A method of setting the after-start fuel-increase correction coefficient KAS will be described later.

In step S102, the controller 7 calculates a water-temperature correction coefficient KTW from a cooling water temperature Tw detected by the water temperature sensor 66 (FIG. 1) and an engine rotation speed detected by the crank angle sensor 62 (FIG. 1). The lower the cooling water temperature Tw, the greater the water-temperature correction coefficient KTW becomes. The calculating method is well known and hence, its description is omitted here.

In step S103, the controller 7 calculates a target equivalent ratio TFBYA from the after-start fuel-increase correction coefficient KAS and the water-temperature correction coefficient KTW by using the following equation.

Equation 2—$TFBYA=1+KAS+KTW$ (2)

The target equivalent ratio TFBYA takes any of values varying with respect to 1.0. After the warming up of the engine is completed, TFBYA=1 (KTW=0, KAS=0) to produce an air-fuel mixture of the theoretical air fuel ratio. In the cold start situation, the target equivalent ratio TFBYA is added with the after-start fuel-increase correction coefficient KAS, so that the target equivalent ratio TFBYA exceeds 1.0. This is because the wall-flow fuel is taken into consideration. When in the cold start situation, the target equivalent ratio TFBYA is set at a value exceeding 1.0. The air-fuel mixture of the theoretical air fuel ratio is produced at and after the time point when the engine rotation speed reaches the target idling rotation speed NSET.

In step S104, the controller 7 calculates a fuel injection pulse width Ti. Details of the calculation will sequentially be described. The calculated fuel injection pulse width Ti is loaded into an output register. When a predetermined fuel injection timing is reached, the fuel injection valve 52 of each cylinder is sequentially opened during the fuel injection pulse width Ti.

FIG. 5 is a flow chart showing a calculation routine for calculating the after-start fuel-increase correction coefficient KAS.

In step S11, the controller 7 determines whether or not the ignition switch is switched from the off-state to the on-state is reached. If the answer is YES, the controller advances to step S21. If the answer is NO, the controller advances to step S14.

In step S12, the controller 7 calculates an initial value KAS0 of the after-start fuel-increase correction coefficient from an at-start water temperature TWINT detected by the water temperature sensor 66. The greater the initial value KAS0 of the after-start fuel-increase correction coefficient, the lower the at-start water temperature TWINT becomes.

In step S13, the controller 7 sets the initial value KAS0 of the after-start fuel-increase correction coefficient as the after-start fuel-increase correction coefficient KAS.

In step S14, the controller 7 determines whether or not the expected engine rotation speed Nf is greater the target idling rotation speed NSET. If Nf<NSET, the controller advances to step S15. If Nf>NSET, the controller advances to step S16. The expected engine rotation speed Nf is an engine rotation speed expected when the cylinder being in the exhaust stroke (fuel injection period) has entered the combustion stroke (the period that the air fuel mixture ignited is combusted or the period that the piston is expanded) in operation. By calculating the expected engine rotation speed Nf, an engine rotation speed is expected in advance when a cylinder which is currently time positioned in the fuel injection period is combusted. The expected engine rotation speed Nf is calculated from an increment in a variation of the actual engine rotation speed Ne detected by the crank angle sensor 62 or using a characteristic map previously adapted to the engine being controlled.

In step S15, the controller 7 sets a previous value KASz of the after-start fuel-increase correction coefficient as a current value KAS of the after-start fuel-increase correction coefficient.

In step S16, the controller 7 determines whether or not the previous value Nz of the expected engine rotation speed is less than the target idling rotation speed NSET. If Nz<NSET, the controller advances to step S17, and if Nz>NSET, the controller advances to step S18. When the expected engine rotation speed Nf is greater than the target idling rotation speed NSET in step S14, the process of step S16 is carried out. Accordingly, the time point when the controller advances to step S17 is the time point when the expected engine rotation speed Nf first reaches the target idling rotation speed NSET.

In step S17, the controller 7 sets the after-start fuel-increase correction coefficient KAS according to a characteristic map stored the ROM in advance. The characteristic map is prepared based on experiments in advance. In the characteristic map, the after-start fuel-increase correction coefficient KAS is set to be greater than the after-start fuel-increase correction coefficient KAS set when the controller advances to step S20 without advancing to step S117.

In step S18, the controller 7 determines whether or not a two-times-ago value Nzz of the expected engine rotation speed is less than the target idling rotation speed NSET. If Nzz<NSET, the controller goes to step S19, and if Nzz>NSET, the controller goes to step S20. The controller goes to step S19 in the cycle immediately after the fuel is temporarily increased in step S17.

In step S19, the controller 7 sets a two-times-ago value KASss of the after-start fuel-increase correction coefficient as the previous value KASz of the after-start fuel-increase correction coefficient.

In step S20, the controller 7 calculates the after-start fuel-increase correction coefficient KAS by using the following equation:

Equation 3 $KAS=(1-\Delta t)\times KASZ$ (3)

where $\Delta t$ is a constant value; and KASz is a previous value of KAS.

The predetermined value $\Delta t$ is a constant value for defining a decrement per given time of the after-start fuel-increase correction coefficient KAS and is determined in advance.

The constant value $\Delta t$ in the equation (3) defines a decrement per given time of the after-start fuel-increase correction coefficient KAS, and is determined to be zero at a time point that the intake pressure settles down at a fixed value, which is determined in advance.

In step S21, the controller 7 determines whether the after-start fuel-increase correction coefficient KAS is positive or negative. If KAS>0, the control finishes the processing, and, if the value is negative, the controller goes to step S22.

Figure 6:
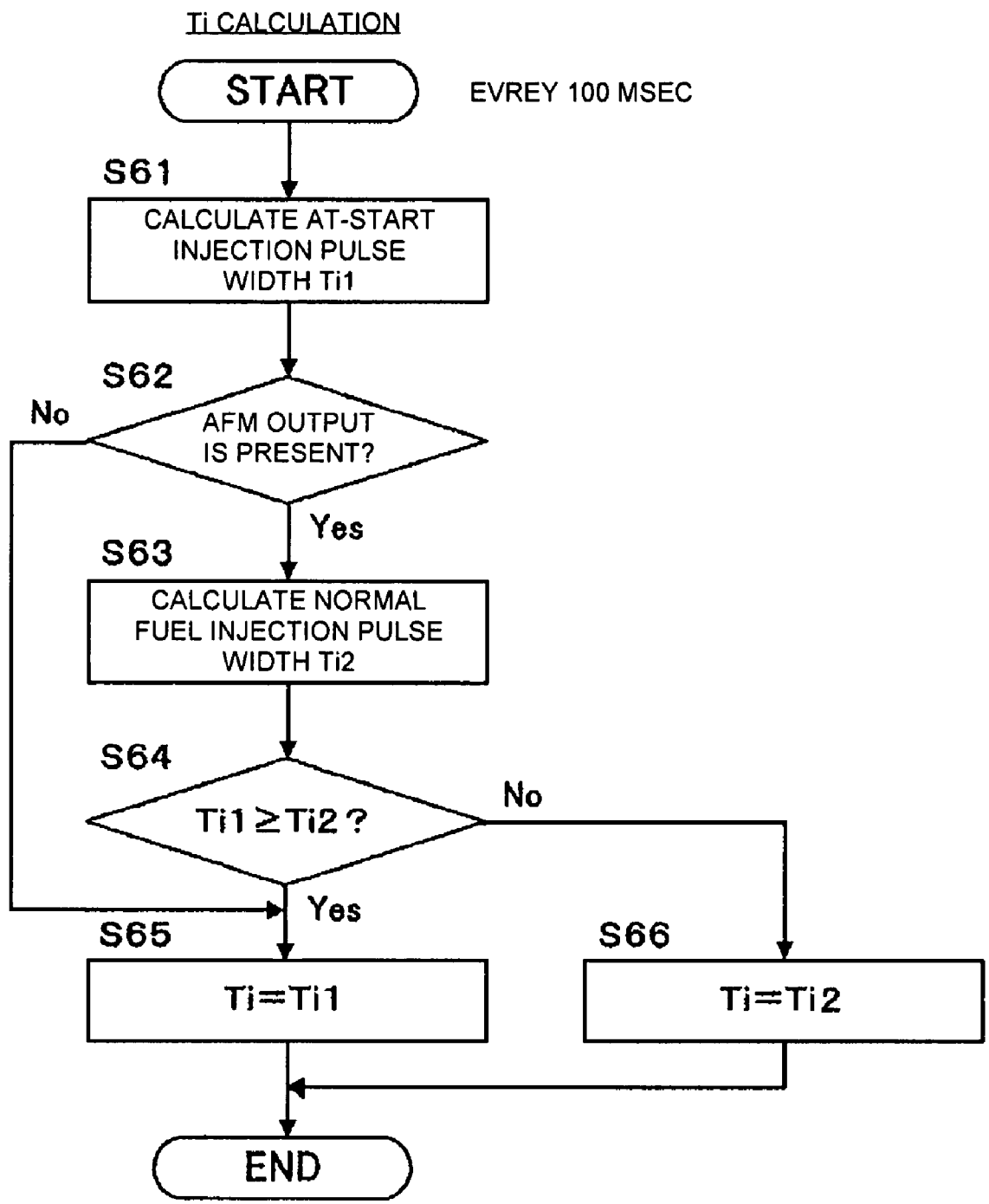
FIG. 6 is a flow chart for calculating a fuel injection pulse width Ti.

In step S22, the controller 7 sets the after-start fuel-increase correction coefficient KAS to 0. FIG. 6 is a flow chart for calculating a fuel injection pulse width Ti. The program of the flow chart is independently executed at fixed time intervals (e.g., every 100 ms).

In FIG. 6, in step S61, the controller calculates a at-start injection pulse width Ti1 by the following equation:

Equation 4 $Ti1=TST\times KNST\times KTST$ (4)

where TST is an at-start basic injection pulse width; KNST is a rotation speed correction coefficient; and KTST is a time correction coefficient.

The calculating methods of the at-start basic injection pulse width TST, the rotation speed correction coefficient KNST, and the time correction coefficient KTST are well known, and description of the details of their methods is omitted.

In step S62, the controller checks whether or not the output signal from the air flow meter 61 is input. If the output of the air flow meter 61 is not input, the controller passes steps S63 and 64 and jumps to step S65. The controller sets the at-start injection pulse width Ti1 as the final fuel injection pulse width Ti.

Figure 16:
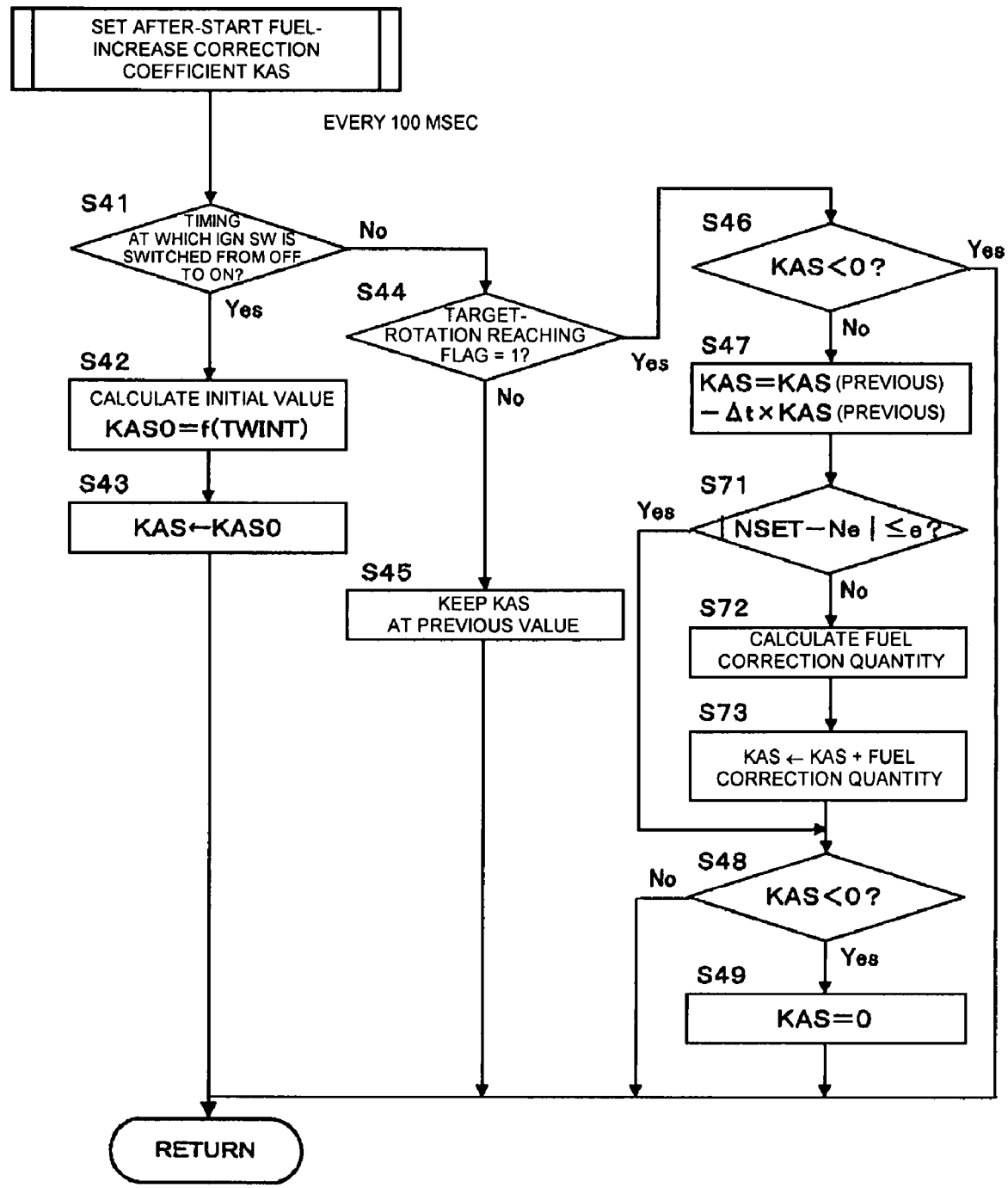
FIG. 16 is a flow chart showing a calculation routine for calculating an after-start fuel-increase correction coefficient KAS in the sixth embodiment.

If the output signal from the air flow meter 61 is input, the controller advances from step S62 to step S63, and calculates a fuel injection pulse width Ti2 in a normal state (referred to as a "normal fuel injection pulse width") from a target equivalent ratio TFBYA, which is obtained from FIG. 16, by using the following equation.

Equation 5 $Ti2=(Tp\times TFBYA+Kathos)\times(\alpha+\alpha m-1)\times 2+Ts$ (5)

where Tp is a basic injection pulse width; TFBYA is a target equivalent ratio; Kathos is a transient correction quantity; a is an air-fuel ratio feedback correction coefficient $\alpha$; $\alpha m$ is an air-fuel ratio learning value; and Ts is an invalid injection pulse width.

The methods of calculating the basic injection pulse width Tp, the transient correction quantity Kathos, the air-fuel ratio feedback correction coefficient $\alpha$, the air-fuel ratio learning value am, and the invalid injection pulse width Ts in the equation (4) are well known. The basic injection pulse width Tp, for example, is given by the following equation.

Equation 6 $Tp=K\times Qa/Ne$ (6)

where Qa is an intake air amount Qa.

The air fuel ratio of the air fuel mixture is set at the theoretical air fuel ratio by using a constant K in the equation (6). Accordingly, the amount of the fuel (fuel injection pulse width Ti) injected from the fuel injection valve 52 is corrected for increase when the after-start fuel-increase correction coefficient KAS is a positive value.

The transient correction quantity Kathos in the equation (5) is calculated from the load and the rotation speed of the engine and temperature of the fuel attaching part, while taking the amount of the wall-flow fuel on the intake port. It is estimated that when the engine is started, this transient correction quantity Kathos would increase the fuel by the amount of the fuel flowing on and along the intake port wall, branched from the injection fuel. However, the experiment showed that the air fuel ratio was excessively lean. This is due to changes of the intake pressure and the intake flow velocity not being taken into consideration in the calculation of the transient correction quantity Kathos.

In steps S64 to S66, the controller compares the at-start injection pulse width Ti1 with the normal fuel injection pulse width Ti2, and selects the larger width as the final fuel injection pulse width Ti.

The after-start fuel-increase correction coefficient KAS is used for the fuel injection when the normal fuel injection pulse width Ti2 is used for the final fuel injection pulse width Ti. In the embodiment, the normal fuel injection pulse width Ti2 is larger than the at-start injection pulse width Ti1.

Figure 9:
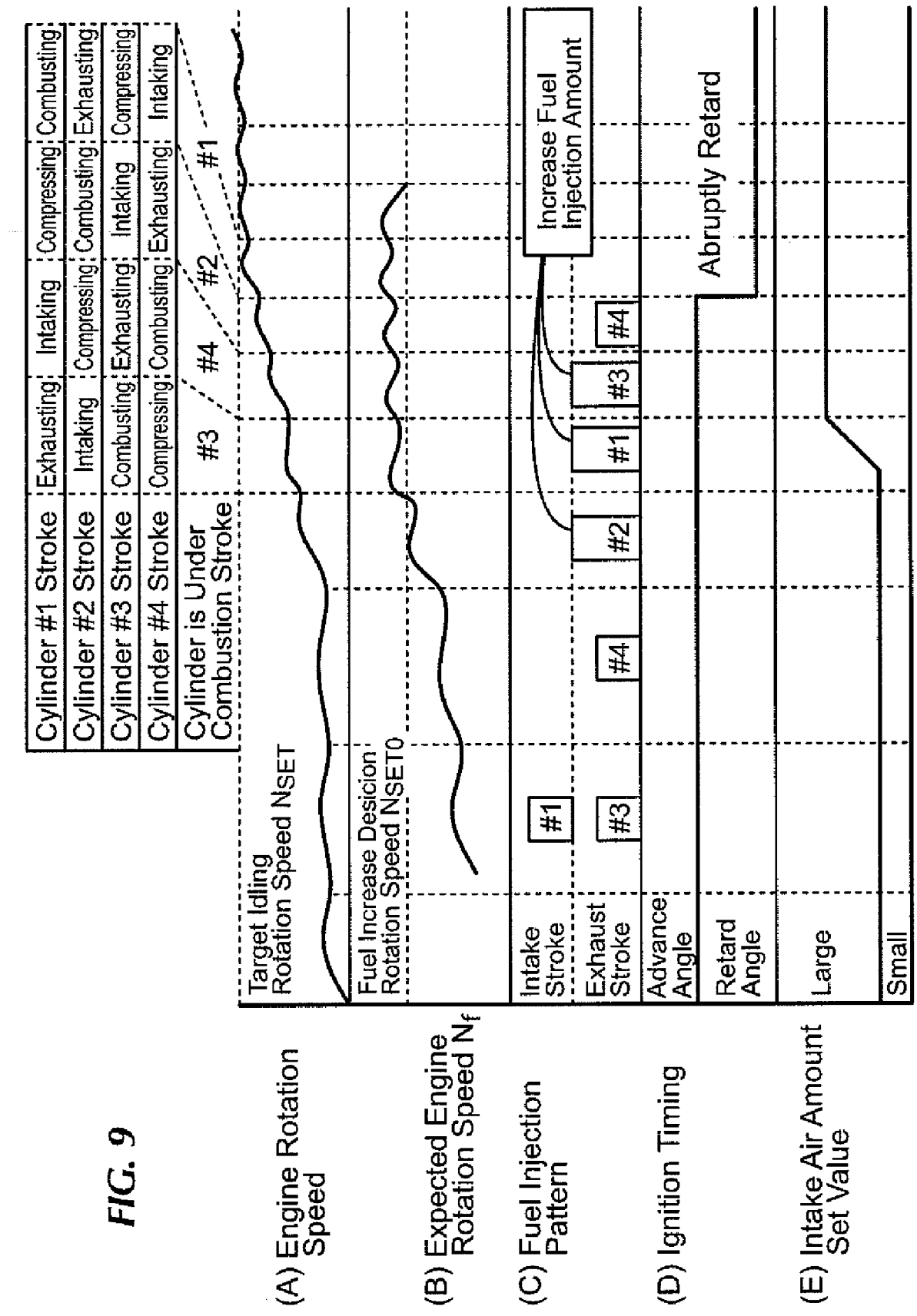
FIG. 9 is a timing chart showing operations of an engine start control apparatus according to a second embodiment of the present invention.

FIG. 9 is a timing chart showing operations of an engine start control apparatus according to a second embodiment of the present invention. As with the first embodiment, a four-cylinder engine is used for illustrative purposes only. Subsequent embodiments disclosed below continue with the example of the four-cylinder engine as well.

In the embodiments to be given hereunder, like or equivalent portions are designated by like reference numerals in the first embodiment.

In the second embodiment, the controller determines a cylinder expected to be in the combustion stroke when the engine rotation speed at engine startup reaches the target idling rotation speed NSET. The controller increases the amount of fuel injected into the cylinder and the cylinders preceding and subsequent to the former which are in the exhaust stroke immediately before the engine rotation speed reaches the target idling rotation speed NSET. In a specific control, a decision value NSET0 for determining a cylinder which is preceding by one in the ignition order is set for a cylinder expected to be in the combustion stroke when the engine rotation speed at engine startup reaches the target idling rotation speed NSET. When the expected engine rotation speed Nf reaches the decision value NSET0, the controller then increases the amount of fuel injected to three cylinders which will be in the exhaust stroke.

In this embodiment, the amount of fuel injected is successively increased for the three cylinders, including the cylinder to have such a state that the engine rotation speed reaches the target idling rotation speed NSET. Accordingly, an amount of increment of the fuel per cylinder is reduced. As a result, misfire of the engine from a too rich air fuel mixture hardly occurs and stable combustion performances are secured.

Figure 10:
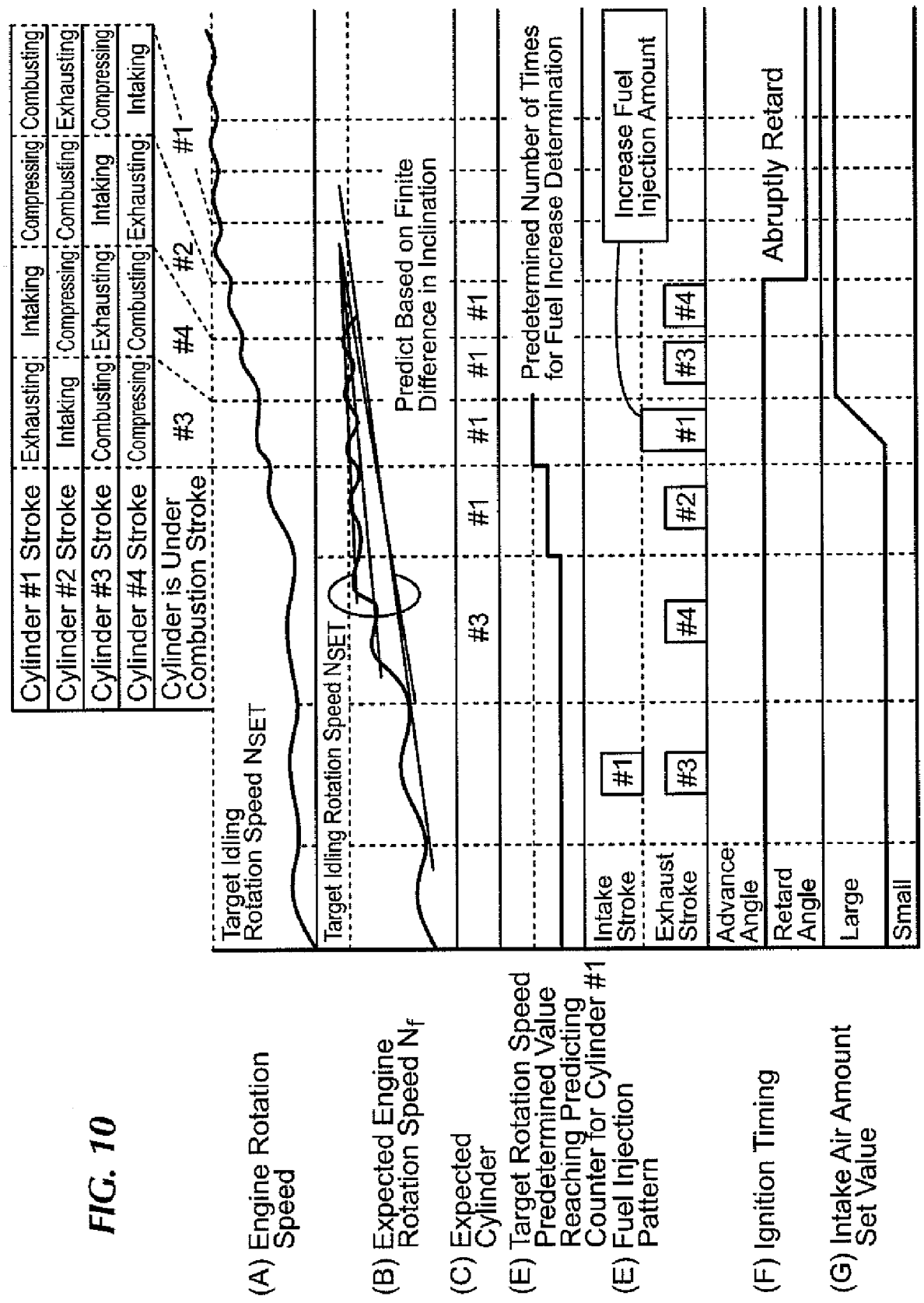
FIG. 10 is a timing chart showing operations of an engine start control apparatus according to a third embodiment of the present invention.

FIG. 10 is a timing chart showing operations of an engine start control apparatus according to a third embodiment of the present invention.

In the present embodiment, the following prediction is made on a cylinder estimated such that the expected engine rotation speed Nf reaches the target idling rotation speed NSET.

The controller predicts which cylinder, when counted from the current cylinder, is in the combustion stroke and has a rotation speed reaching the target idling rotation speed NSET on the basis of a finite difference of a quantity of change (inclination) of the expected engine rotation speed Nf (section C of FIG. 10). When the prediction is that the rotation speed of the cylinder will reach the target idling rotation speed, the controller increments the counter associated with the cylinder. The counter associated with the cylinder #1 is illustrated in section D of FIG. 10. Actually, the counters are provided in association with the respective cylinders. When a counter value of the counter of a cylinder (cylinder #1 in this embodiment) exceeds a predetermined value, the controller predicts that the cylinder will have a rotation speed reaching the target idling rotation speed, and increases the amount of fuel injected into the cylinder.

In an alternative, a decision value NSET0 for determining the cylinder preceding by one to a cylinder of which the rotation speed reaches the target idling rotation speed NSET is set up as in the second embodiment. When the expected engine rotation speed Nf reaches the decision value NSET0, the controller increases the amount of the fuel to be injected three times from then on.

The third embodiment more precisely determines the cylinder to have rotation speed reaching the target idling rotation speed.

Figure 11:
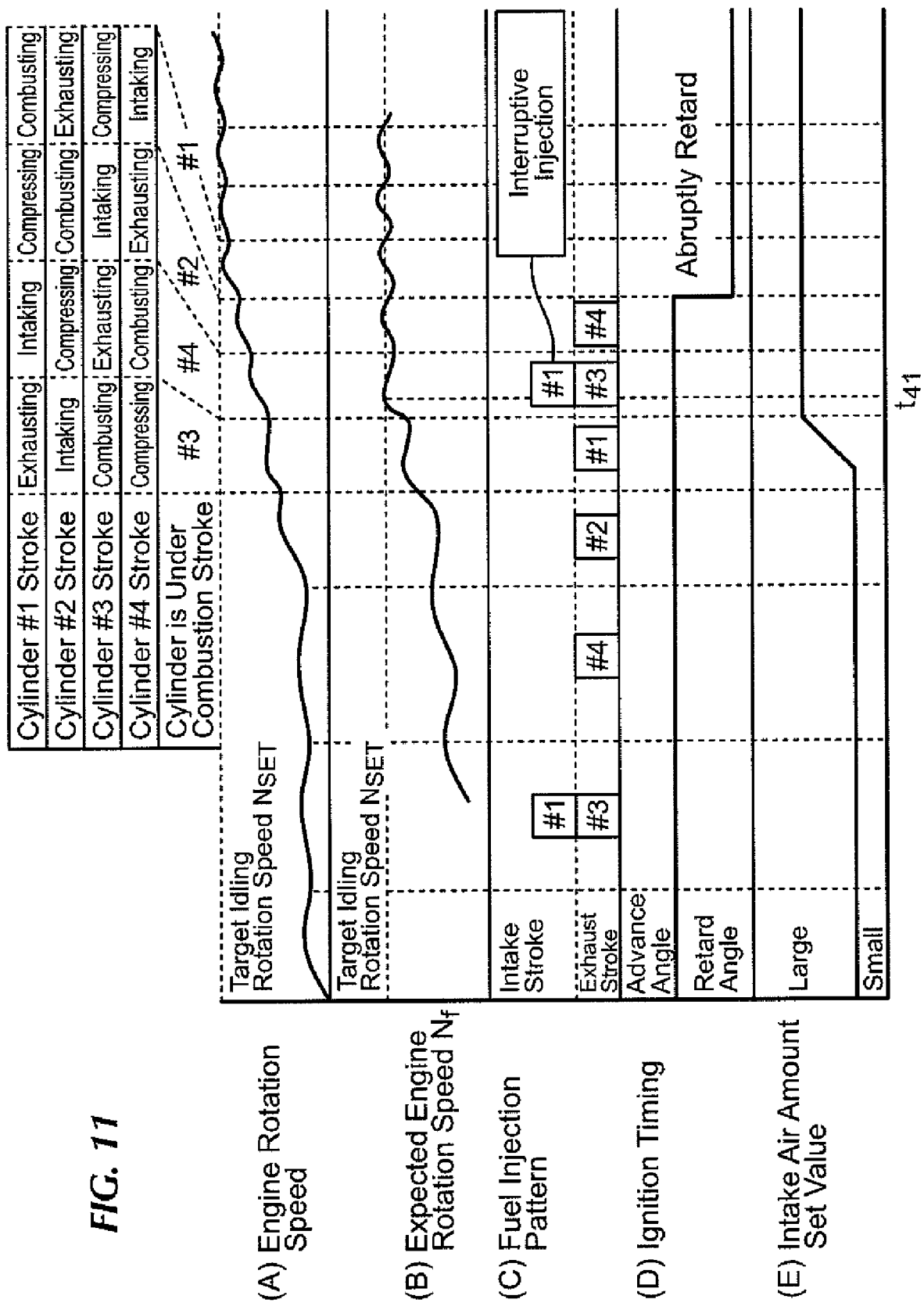
FIG. 11 is a timing chart showing operations of an engine start control apparatus according to a fourth embodiment of the present invention.

FIG. 11 is a timing chart showing operations of an engine start control apparatus according to a fourth embodiment of the present invention.

In the fourth embodiment, the controller determines a cylinder having a rotation speed that reaches the target idling rotation speed NSET. When the exhaust stroke of the cylinder has completed at the instant that the determination is made, fuel is interruptively injected into the determined cylinder in the intake stroke.

In FIG. 11, the controller predicts that the rotation speed of the cylinder #1 will reach the target idling rotation speed NSET at time point t41. However, at this time point, the exhaust stroke of the cylinder #1 has completed. To cope with this, the fuel is interruptively injected into the cylinder #1 in the intake stroke.

Also in the fourth embodiment, the air fuel ratio is set to be near the theoretical air fuel ratio, and the three-way catalyst cleans the exhaust gas, thereby providing no increase of the exhaust amount of HC.

Figure 12:
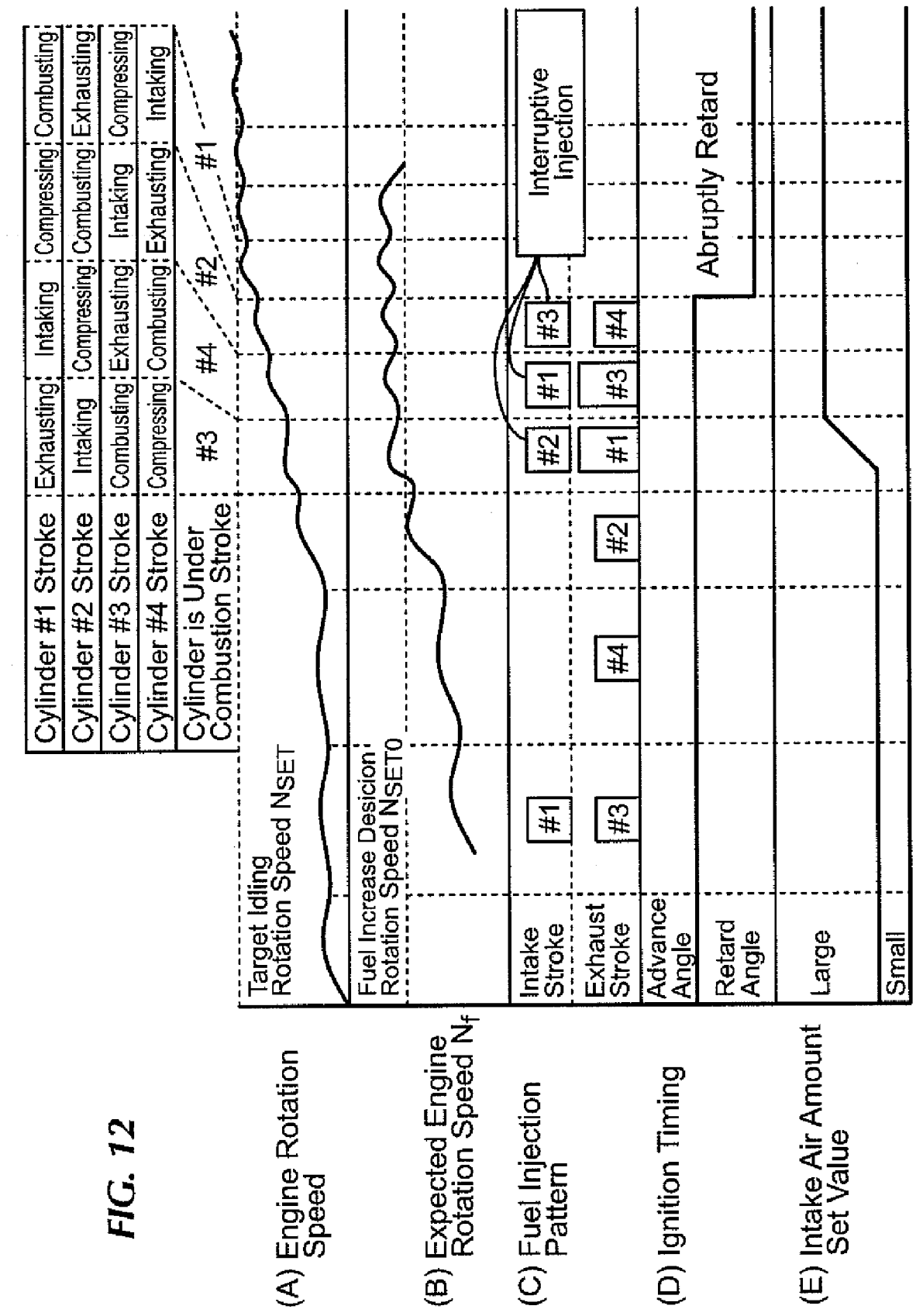
FIG. 12 is a timing chart showing operations of an engine start control apparatus according to a fifth embodiment of the present invention.

FIG. 12 is a timing chart showing operations of an engine start control apparatus according to a fifth embodiment of the present invention.

A decision value NSET0 for determining a cylinder which is preceding by one in the ignition order is set for a cylinder expected to be in the combustion stroke when the engine rotation speed at start of the engine reaches the target idling rotation speed NSET. When the expected engine rotation speed Nf reaches the decision value NSET0, the controller determines the cylinder preceding by one to the cylinder of which the rotation speed reaches the target idling rotation speed NSET. However, at a time point when the cylinder is determined, the exhaust stroke of the cylinder #1 has completed. Accordingly, the fuel is interruptively injected into the three successive cylinders, including the determined cylinder in the intake stroke. In the exhaust stroke, the amount of fuel injected is increased.

Also in the present embodiment, the air fuel ratio is set to be near the theoretical air fuel ratio, and the three-way catalyst cleans the exhaust gas, thereby providing no increase of the exhaust amount of HC.

It should be understood that the present invention is not limited to the first to fifth embodiments, but may variously be modified, altered and changed within the scope of the invention. For example, in the second and fifth embodiments, the amount of the fuel injected to the three successive cylinders is increased or the fuel is interruptively injected into those successive cylinders. If required, the number of those successive cylinders may be two, while the number is three in the embodiments.

Figure 13:
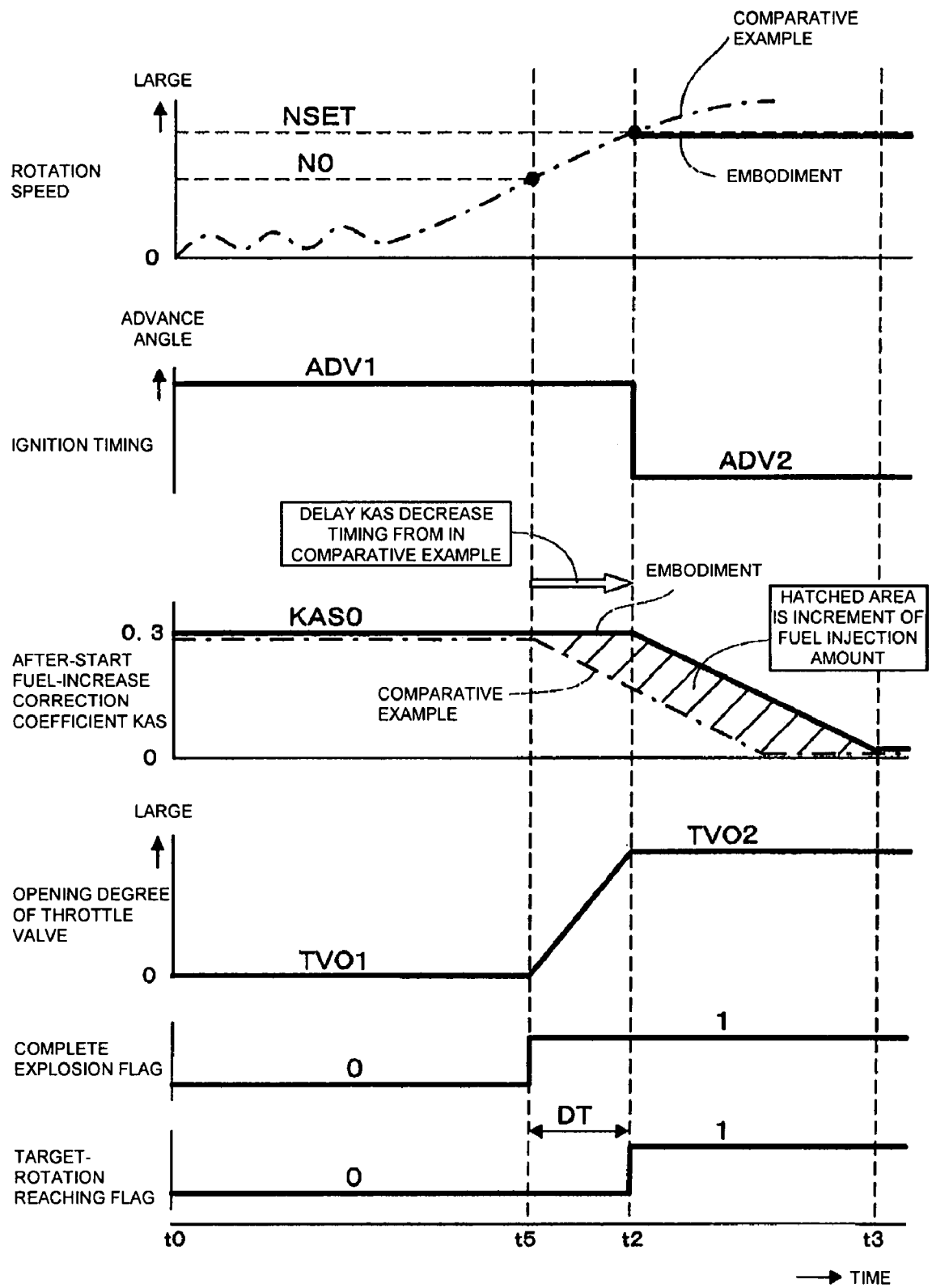
FIG. 13 is a timing chart showing operations of an engine start control apparatus according to a sixth embodiment of the present invention.

FIG. 13 is a timing chart showing operations of an engine start control apparatus according to a sixth embodiment of the present invention.

In the present embodiment, and in the first embodiment shown in FIG. 8, by stepwise retarding the ignition timing at time point t2, the engine rotation speed Ne settles down to be the target idling rotation speed NSET. Immediately after the engine rotation speed settles down, however, the intake pressure and the intake flow velocity in the intake port change, so that the air fuel ratio becomes excessively lean and HC emissions increase, or the engine rotation speed Ne decreases from the target idling rotation speed NSET at the time of idling. To prevent the increase of the HC, as indicated by a solid line in section E of FIG. 8, the fuel injection amount is temporarily increased to compensate for a decrease of the amount of the wall-flow fuel to the combustion chamber 5 during a time period from time point t1 at which the intake throttle 51a starts to open to time point t3 at which variations of the intake pressure and the intake flow velocity in the intake port settle down.

Also in the sixth embodiment, as in the first embodiment, the after-start fuel-increase correction coefficient KAS is used in the control of the fuel injection amount. In the present embodiment, an engine operation state is detected using a time elapsing from the complete ignition of the engine. This will be described by using a timing chart shown in FIG. 13.

In FIG. 13, a variation of the rotation speed is depicted on the top line; the ignition period, on the second line; the after-start fuel-increase correction coefficient KAS, on the third line; the throttle-valve target opening-degree, on the fourth line; and the complete explosion flag and the target-rotation reaching flag, on the fifth line and the bottom line. Variations of the items in FIG. 13, which correspond to the items (rotation speed, ignition timing, and throttle-valve target opening-degree) in FIG. 8 are depicted differently from those of the latter.

To begin with, in a comparative example, as indicated by a one dot chain line on the third line in FIG. 3, an initial value KAS0 (0.3 in the figure) is set as the after-start fuel-increase correction coefficient KAS at time point t0 when the starter switch 36 is switched from an off state to an on state. The after-start fuel-increase correction coefficient descends toward zero at a predetermined rate from time point t5 when the engine rotation speed Ne reaches the complete-ignition rotation speed N0. In the present embodiment, as indicated by a solid line on the third line in FIG. 13, the after-start fuel-increase correction coefficient is kept at the initial value KAS0 until time point t2, and starts to descend toward zero from time point t2. Thus, the timing when the after-start fuel-increase correction coefficient KAS starts to decrease from the initial value KAS0 is retarded from time point t5 to time point t2. As a result, the amount of the fuel is increased by a hatched area on the third line, to thereby prevent the air fuel ratio from exceeding the theoretical air fuel ratio and becoming excessive lean.

Thus, it is confirmed that an actual air fuel ratio which is obtained when the timing where the after-start fuel-increase correction coefficient KAS decreases from the initial value KAS0 is retarded from time point t5 to time point t2 (amount of the fuel injection from the fuel injection valve is temporarily increased) is equal to the theoretical air fuel ratio. In other words, the after-start fuel-increase correction coefficient KAS (amount of the increased fuel injected from the fuel injection valve 52 in FIG. 1) is selected so that the actual air fuel ratio obtained when the amount of fuel injected from the fuel injection valve 52 is temporarily increased is equal to the theoretical air fuel ratio.

In this embodiment, the after-start fuel-increase correction coefficient KAS is kept at a fixed value (initial value KAS0) during time point t5 to time point t2 and linearly declines from time point t2. The profile of the variation of the after-start fuel-increase correction coefficient is not limited to such a profile. The after-start fuel-increase correction coefficient KAS is varied so that the amount of the fuel injected from the fuel injection valve 52 is temporarily increased during the time period from time point t5, at which the intake throttle 51a starts to open to time point t3 when variations of the intake pressure, to when the intake flow velocity settles down, which occurs after the time point when the engine rotation speed Ne reaches the target idling rotation speed NSET.

In the embodiment, the amount of the fuel injected from the fuel injection valve is temporarily increased by retarding the timing when the after-start fuel-increase correction coefficient KAS is decreased from the initial value KAS0 from time point t5 to time point t2. It is evident that the temporary increase of the injection fuel amount may be achieved in another manner. For example, a fuel-increase correction coefficient may be used in addition to the after-start fuel-increase correction coefficient KAS. By using the fuel-increase correction coefficient, the amount of the fuel injected from the fuel injection valve may be temporarily increased during a time period from time point t5 when the intake throttle 51a starts to open to time point t3 when the variations of the intake pressure and the intake flow velocity of the intake port settle down after the engine rotation speed Ne reaches the target idling rotation speed NSET at the time of idling.

In FIG. 13, the intake throttle 51a starts to open at time point t5 when the engine rotation speed Ne reaches the complete-ignition rotation speed N0, but this is not limited thereto.

In an comparative example, the after-start fuel-increase correction coefficient KAS starts to gradually decrease at the time point when the engine rotation speed Ne reaches the complete-ignition rotation speed N0. In the present embodiment, the initial value is kept until the engine rotation speed Ne is equal to the target rotation speed NSET at the time of idling, and the after-start fuel-increase correction coefficient starts to gradually decrease from the time point when the engine rotation speed Ne is equal to the target rotation speed NSET at the time of idling.

In the control system where the feedback control of the air fuel ratio starts at the timing when the $O_2$ sensor 64 is activated, the timing to start the feedback control of the air fuel ratio may be positioned before time point t3 when changes of the intake pressure and the intake flow velocity in the intake port settle down after the engine rotation speed Ne reaches the target rotation speed NSET at the time of idling. In this case, the controller may stop the fuel amount increase control using the initial value KAS0 and carry out the feedback control of the air fuel ratio. By so doing, the actual air fuel ratio falls within a given window expanding with respect to the theoretical air fuel ratio through the feedback control of the air fuel ratio, to thereby prevent the air fuel ratio from being excessively lean.

This control carried out by the engine controller 7 in the sixth embodiment will be described by using the following flow chart.

Figure 14:
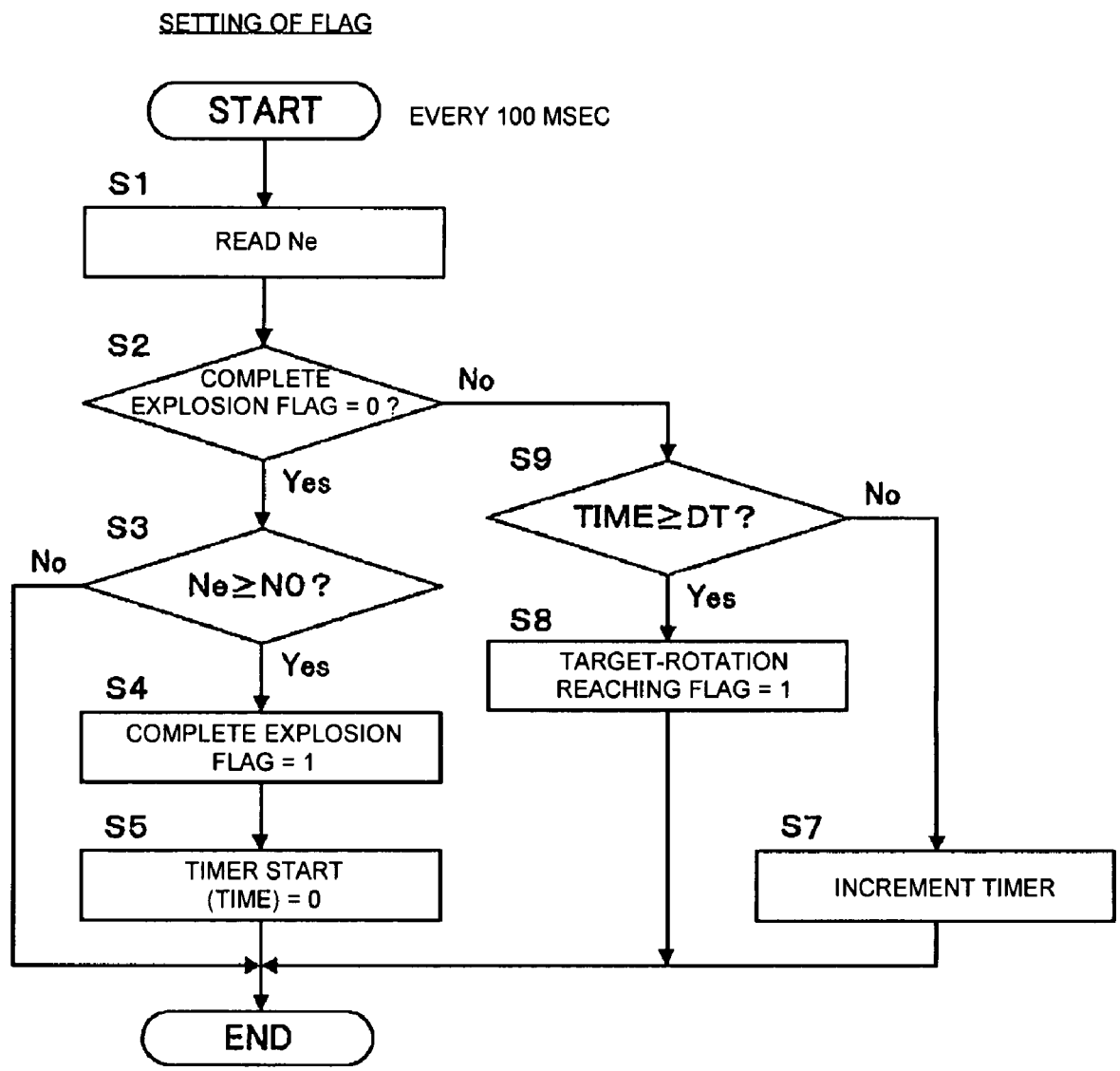
FIG. 14 is a flow chart for setting a complete explosion flag and a target-rotation reaching flag in the sixth embodiment.

FIG. 14 is a flow chart for setting a complete explosion flag and a target-rotation reaching flag, and the program is executed at fixed intervals (every 100 ms).

In FIG. 14, the same steps as those in FIG. 2 are labeled with like step numbers, and description will be given only about the steps not found in FIG. 2.

In step S5, the controller drives the timer to operate (timer value TIME=0). The timer starts to clock from the time point when the engine rotation speed Ne reaches the complete-ignition rotation speed N0.

Complete explosion flag=1 causes the controller to advance from step S2 to step S9 from the next time. In step S9, the controller compares the timer value TIME with a predetermined value DT. The predetermined value DT is adapted in advance at a time interval from the time point when the engine rotation speed Ne reaches the complete-ignition rotation speed N0 to the time point when the engine rotation speed reaches the target rotation speed NSET at the time of idling (see FIG. 13). In the early stage after the timer is started, the timer value TIME is less than the predetermined value DT. The controller advances to step S7 where the controller increments the timer value TIME by a control period (100 ms).

When repeating the incrementing operation of the timer value TIME in step S7, the timer value TIME will reach the predetermined value DT. When TIME>DT, the controller goes from step S9 to step S8 where the controller sets up target-rotation reaching flag (it is initialized to zero when the ignition switch is switched from OFF to ON)=1 to show that the engine rotation speed reaches the target rotation speed NSET at the time of idling.

Also in this embodiment, the ignition timing command value and the throttle-valve target opening-degree may be calculated using the flow chart of FIG. 3.

Figure 15:
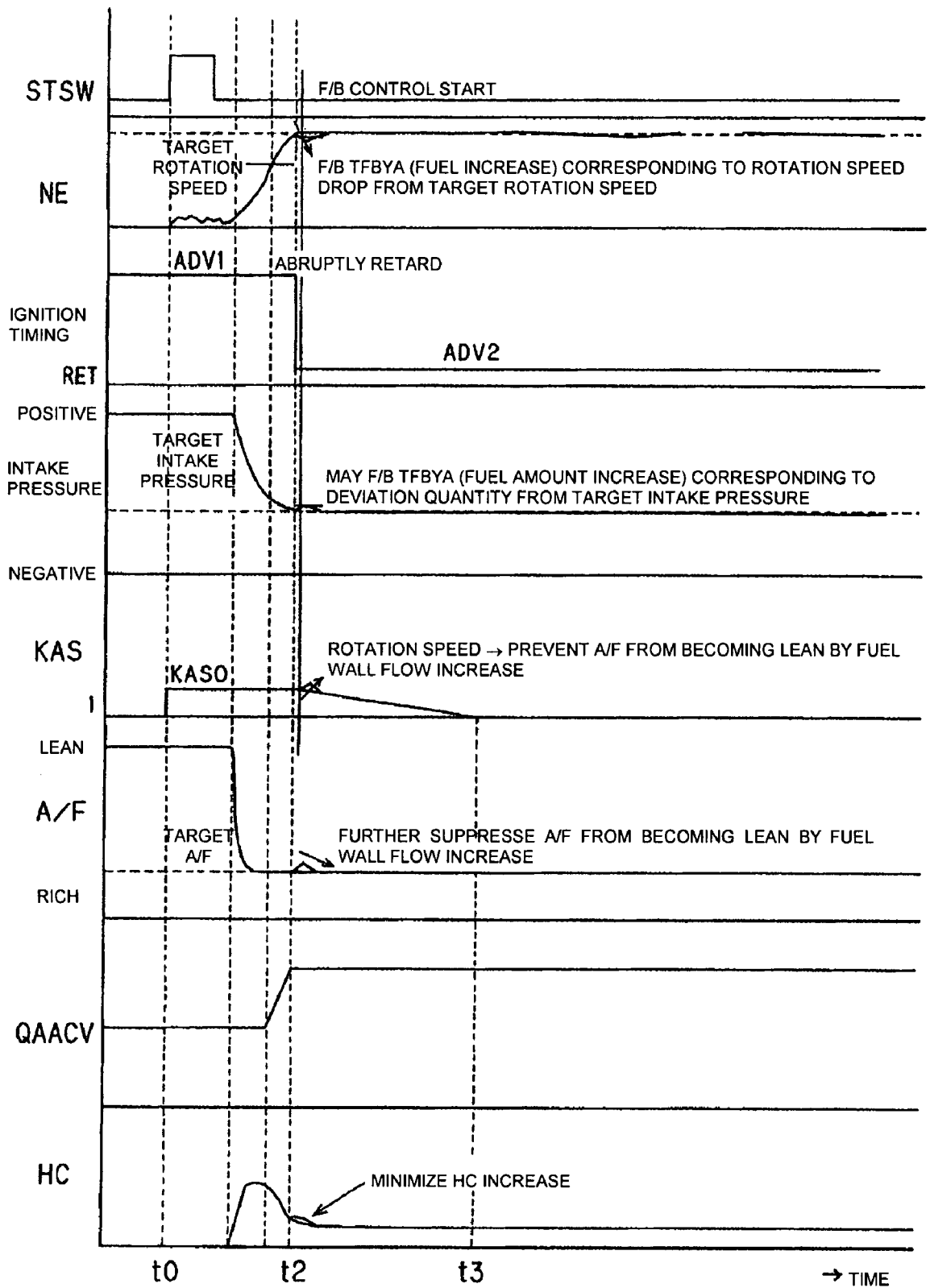
FIG. 15 is a timing chart showing operations of the engine start control apparatus according to the sixth embodiment.

FIG. 15 is a timing chart showing operations of an engine start control apparatus, which is the sixth embodiment of the invention. As seen from the second line in FIG. 15, after the engine rotation speed Ne from cranking reaches the target rotation speed NSET at the time of idling, the engine rotation speed somewhat drops from the target idling rotation speed NSET by unknown reason. The inventors paid attention to this phenomenon. In the embodiment, after the engine rotation speed Ne from cranking reaches the target idling rotation speed NSET at the time of idling, a deviation of the engine rotation speed from the target idling rotation speed NSET is detected and the fuel injection amount is corrected by the deviation. By the control as just mentioned, the embodiment ensures the engine operation at an appropriate air fuel ratio even in a situation where such a minute engine rotation speed occurs.

FIG. 16 is a flow chart showing a calculation routine for calculating an after-start fuel-increase correction coefficient KAS in the sixth embodiment. The routine is executed at fixed time intervals (e.g., 100 ms).

In FIG. 16, the controller checks in step S41 whether or not the time point when the ignition switch is switched from an off state to an on state is reached. At the time point when the ignition switch is switched from an off-state to an on-state, the controller advances to step S42. In this step, the controller calculates the initial value KAS0 of the after-start fuel-increase correction coefficient from an at-start water temperature TWINT detected by the water temperature sensor 66 (FIG. 1). The controller transfers it to the after-start fuel-increase correction coefficient KAS in step S43. The greater the initial value KAS0 of the after-start fuel-increase correction coefficient, the lower the at-start water temperature TWINT becomes.

After the ignition switch is switched from off-state to on-state, that is, when the ignition switch is turned on, the controller goes from step S41 to step S44. In step S44, the controller checks the target-rotation reaching flag (which has been set by the process of FIG. 14). When target-rotation reaching flag=0, the controller advances to step S45 where it keeps the after-start fuel-increase correction coefficient KAS at the previous value (i.e., the initial value KAS0).

When target-rotation reaching flag=1, the controller goes from step S44 to step S46 where it compares the after-start fuel-increase correction coefficient KAS with zero. When target-rotation reaching flag=1, the after-start fuel-increase correction coefficient KAS is greater than zero (since the initial value KAS0 is contained). Accordingly, the controller advances to step S47 where it calculates the after-start fuel-increase correction coefficient KAS by using the following equation:

Equation 7 $KAS=KAS\text{(previous value)}-\Delta t \times KAS\text{(previous value)}$ (7)

where $\Delta t$ is a constant value; and KAS (previous value) is a previous value of KAS.

The predetermined value $\Delta t$ in the equation (7) is a value defining a decrement of the after-start fuel-increase correction coefficient KAS per predetermined time. This value is preset by adaptation so that it is zero at the time point t3 when the intake pressure settles down to a fixed value. An initial value of "KAS (previous)" as the previous value of the after-start fuel-increase correction coefficient KAS is KAS0.

Assuming that when target-rotation reaching flag=1, the controller goes from step S47 to step S48. Unless it takes a negative value as the result of comparing the after-start fuel-increase correction coefficient KAS with zero in step S48, the control ends and the process flow will be repeated. Accordingly, the after-start fuel-increase correction coefficient KAS decreases to a negative value. When it is a negative value in step S48, the controller goes to step S49 where after-start fuel-increase correction coefficient KAS=0.

To cope with this, in the embodiment, when target-rotation reaching flag=1 in step S44 (after the engine rotation speed from cranking reaches the target idling rotation speed at the time of idling), the controller compares the engine rotation speed Ne with the target rotation speed NSET in step S71 after executing the process of step S47. When an absolute value of a difference between the engine rotation speed Ne and the target rotation speed NSET at the time of idling is a predetermined value "e" or smaller, the controller determines that no rotation speed drop from the target rotation speed NSET occurs, the controller passes steps S72 and S73 and jumps to step S48.

When the absolute value of a difference between the engine rotation speed Ne and the target rotation speed NSET at the time of idling reaches the predetermined value "e", the controller determines that a rotation speed drop from the target rotation speed NSET occurs, and advances from step S71 to step S72. In this step, the controller calculates a fuel correction quantity by retrieving a table containing the FIG. 17 contents by using the difference between the engine rotation speed Ne and the target rotation speed NSET at the time of idling. In step S73, the controller adds the calculated fuel correction quantity to the after-start fuel-increase correction coefficient KAS calculated in step S47, and sets the addition result anew as the after-start fuel-increase correction coefficient KAS.

Figure 17:
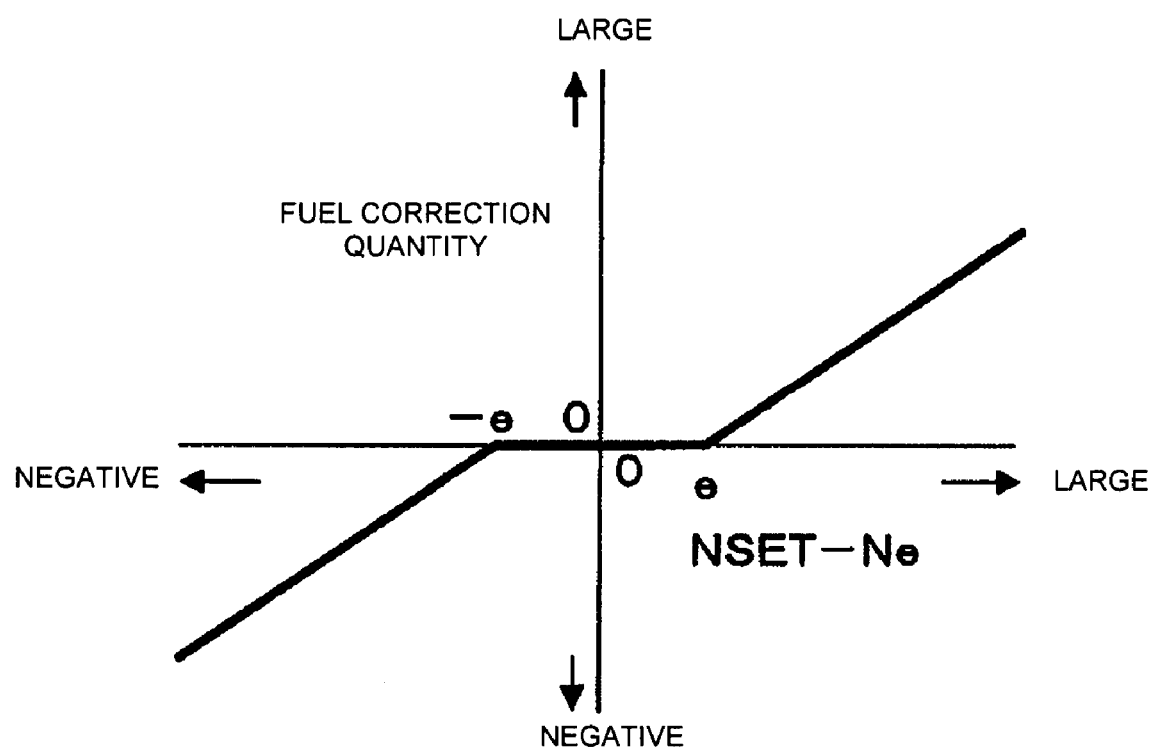
FIG. 17 is a graph diagrammatically showing a fuel correction quantity in the sixth embodiment.

As shown in FIG. 17, the fuel correction quantity is a positive value when the engine rotation speed Ne is less than the result of subtracting the predetermined value "e" from the target rotation speed NSET. Specifically, when the engine rotation speed Ne is less than the result of subtracting the predetermined value "e" from the target rotation speed NSET, the after-start fuel-increase correction coefficient KAS is increased by the fuel correction quantity to increase the engine rotation speed Ne to the target rotation speed NSET. When the engine rotation speed Ne is greater than the result of subtracting the predetermined value "e" from the target rotation speed NSET, the fuel correction quantity is a negative value. When the engine rotation speed Ne is greater than the sum of the predetermined value "e" and the target rotation speed NSET, the after-start fuel-increase correction coefficient KAS is decreased by the fuel correction quantity to decrease the engine rotation speed Ne to the target rotation speed NSET.

In steps S71 to S73, a deviation of the engine rotation speed Ne from the target rotation speed NSET at the time of idling (NSET−Ne) is detected, and the after-start fuel-increase correction coefficient KAS (fuel injection amount) is corrected. If required, the following correction is allowed with the present invention. The deviation of the engine rotation speed Ne from the target rotation speed NSET at the time of idling (NSET−Ne) is detected, and the after-start fuel-increase correction coefficient KAS (fuel injection amount) is corrected according to the deviation (fourth line in FIG. 15). In this case, the target intake pressure at the time of idling is an intake pressure when the engine rotation speed is equal to the target rotation speed NSET at the time of idling, and is obtained as an adaptive value in advance. An actual intake pressure is detected by the intake pressure sensor.

In FIG. 15, a waveform of the intake pressure, depicted on the fourth line is not coincident with that in FIG. 8D. Actually, the intake pressure settles down to the target intake pressure at the same time point t3 as in FIG. 8D.

Operations and useful effects of the sixth embodiment of the invention will be described.

The sixth embodiment is able to increase the temperature of the exhaust gas while suppressing the firing of the engine after the engine rotation speed Ne reaches the target rotation speed NSET at the time of idling. Accordingly, the embodiment reduces the catalyst activation time while reducing useless fuel consumption. The embodiment produces additional useful effects as described below.

After the engine rotation speed Ne from cranking reaches the target rotation speed NSET at the time of idling, a deviation of the engine rotation speed Ne from the target rotation speed NSET at the time of idling is detected. When a deviation of the engine rotation speed from the target rotation speed NSET is detected (second line in FIG. 15), the after-start fuel-increase correction coefficient KAS is corrected according to the deviation from target rotation speed NSET (steps s44, S71, S72 and S73 in FIG. 16). Therefore, even when the engine rotation speed drops from the target rotation speed NSET after it reaches the target rotation speed NSET (after time point t2), the engine rotation speed quickly resumes the original speed after it drops from the target rotation speed NSET. The result is to realize a stable idling rotation speed control and to minimize the emission of HC in the exhaust gas.

When the engine rotation speed decreases from the target rotation speed NSET, the fuel wall-flow on the wall of the intake port 23 increases by the decrease of the rotation speed, the amount of fuel injected to the combustion chamber 5 is decreased by the increase of the fuel wall flow, and the target idling rotation speed is lean. In the present embodiment, by reducing the decrease of the engine rotation speed from the target rotation speed NSET, the air fuel ratio is made flat in graphic profile, even after the time point t2 when the engine rotation speed Ne reaches the target rotation speed NSET.

Figure 18:
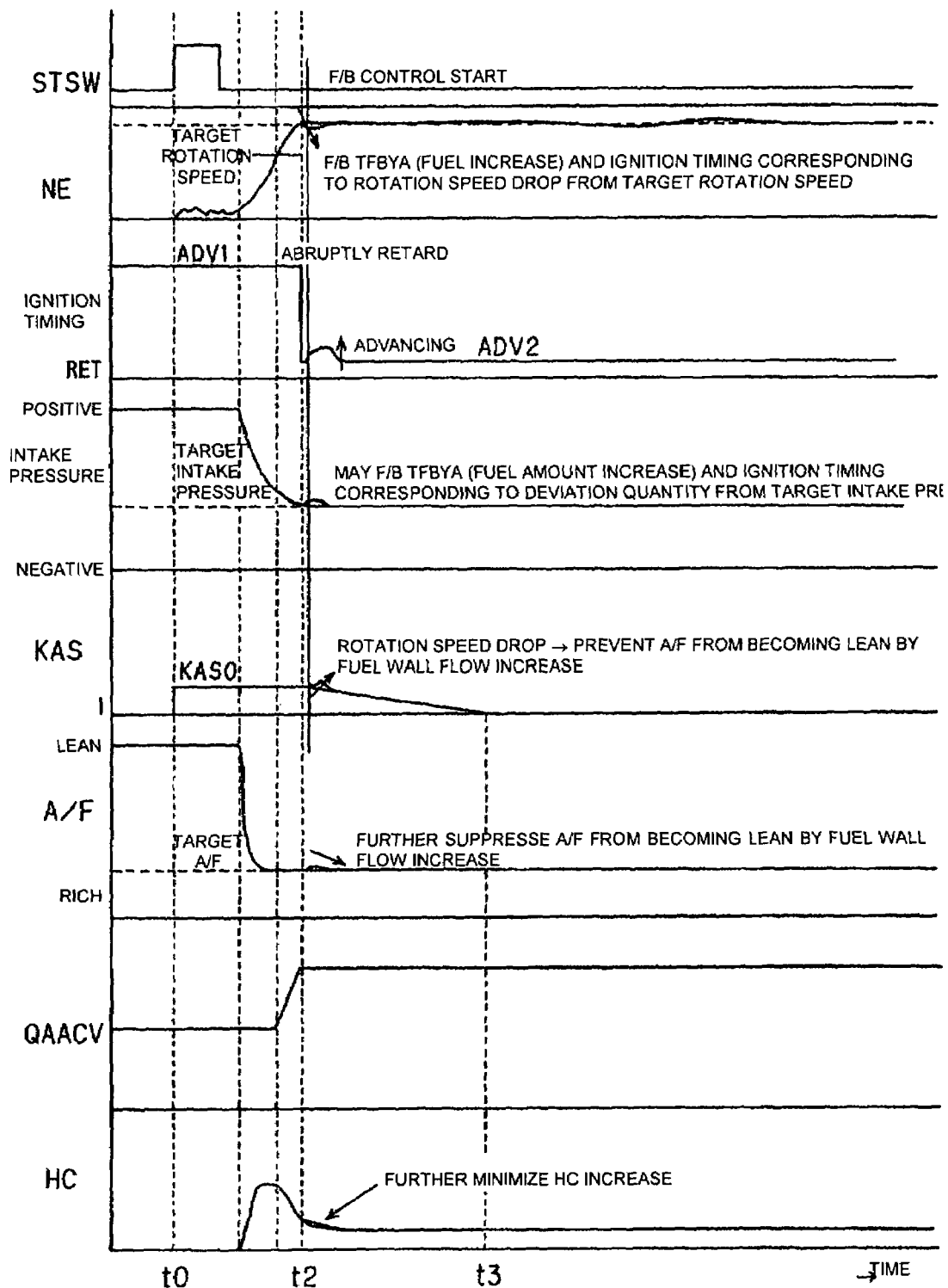
FIG. 18 is a timing chart showing operations of an engine start control apparatus according to a seventh embodiment of the present invention.

FIG. 18 is a timing chart showing operations of an engine start control apparatus according to a seventh embodiment of the present invention. In the sixth embodiment, as recalled, after the engine rotation speed Ne from cranking reaches the target rotation speed NSET at the time of idling, an engine rotation speed deviation from the target rotation speed NSET is detected, and the after-start fuel-increase correction coefficient KAS (fuel injection amount) is corrected according to the deviation. In the seventh embodiment, when compared with the sixth embodiment, after the engine rotation speed Ne from cranking reaches the target rotation speed NSET at the time of idling, the ignition timing for the catalyst warming-up is further corrected according to the engine rotation speed deviation from the target rotation speed NSET.

Figure 19:
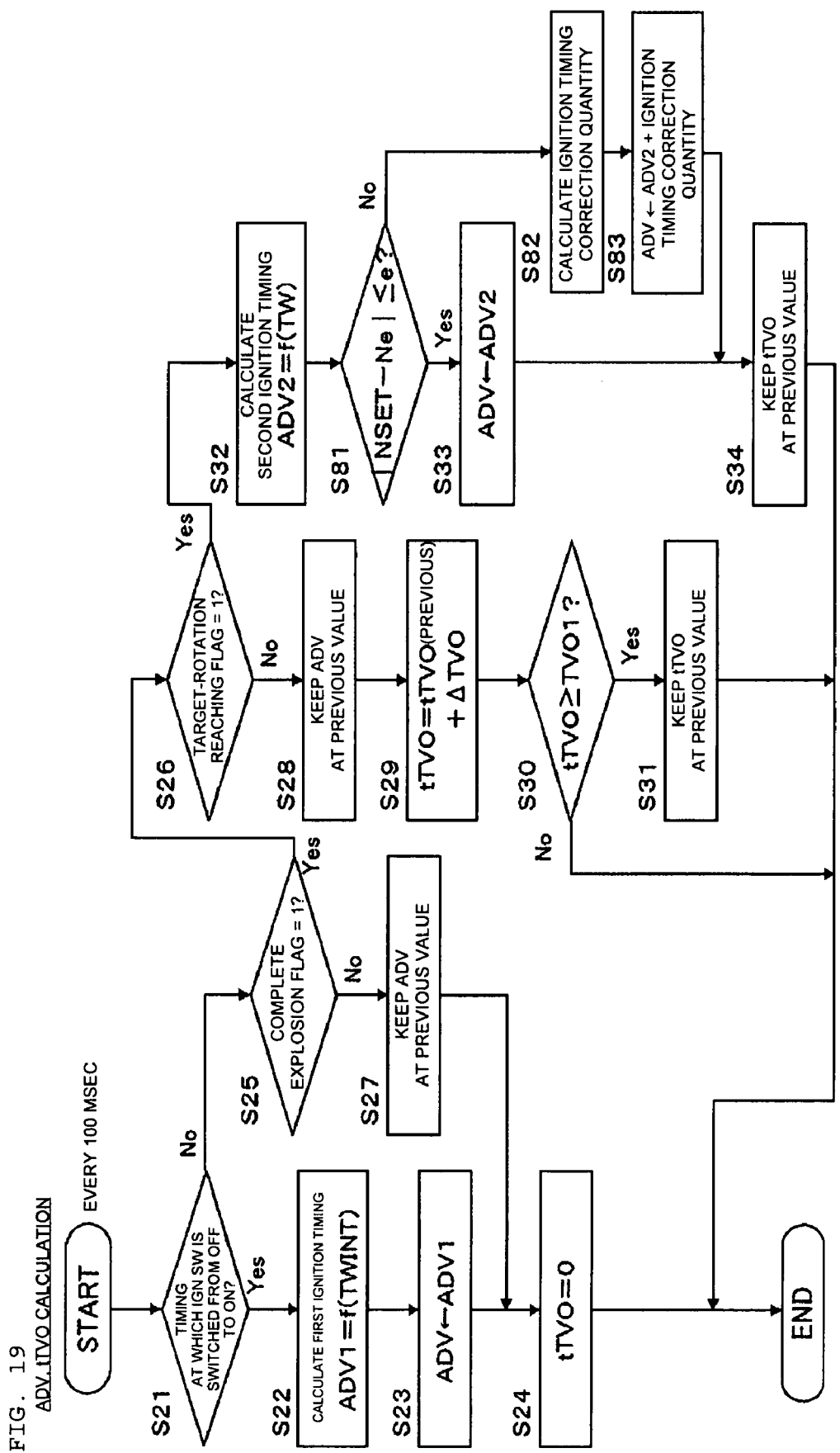
FIG. 19 is a flow chart for calculating an ignition timing command value and a throttle valve target opening-degree in the seventh embodiment.

FIG. 19 is a flow chart for calculating an ignition timing command value and a throttle valve target opening-degree in the seventh embodiment. In FIG. 19, the same steps as those in FIG. 3 are labeled with like step numbers.

In FIG. 19, steps S81 to S83 are added to the flow chart of FIG. 3. When target-rotation reaching flag=1 in step S26 (after the time point when the engine rotation speed from cranking reaches the target rotation speed at the time of idling), the controller compares an absolute value between the engine rotation speed Ne and the target rotation speed NSET at the time of idling with a predetermined value "e" in step S81. When an absolute value between the engine rotation speed Ne and the target rotation speed NSET at the time of idling is less than the predetermined value "e", the controller determines that no rotation speed drop from the target rotation speed NSET occurs, and advances to steps S33 and S34. In those steps, the controller sets the second ignition timing ADV2 to the ignition timing command value ADV, and keeps the throttle-valve opening degree tTVO at the previous value (=TVO1).

When an absolute value of the difference between the engine rotation speed Ne and the target rotation speed NSET at the time of idling reaches the predetermined value "e", for example, when the engine rotation speed Ne is less than a value of subtracting the target rotation speed NSET from the predetermined value "e", the controller determines that the rotation speed drop from the target rotation speed NSET occurs and advances to step S82. In step S82, the controller calculates an ignition-timing correction quantity by a table containing the FIG. 13 contents by using the difference between the engine rotation speed Ne and the target rotation speed NSET at the time of idling. The controller sets the sum of adding the ignition-timing correction quantity to the second ignition timing ADV2 to the ignition timing command value ADV in step S83, and executes the process of step S34.

The unit of the ignition timing command value ADV is a crank angle measured at a point closer to the advance angle side than the compression top dead point. When the ignition-timing correction quantity is positive, it is the correction quantity on the advance angle side, and when the ignition-timing correction quantity is positive, it is a correction quantity on the retard angle side.

Figure 20:
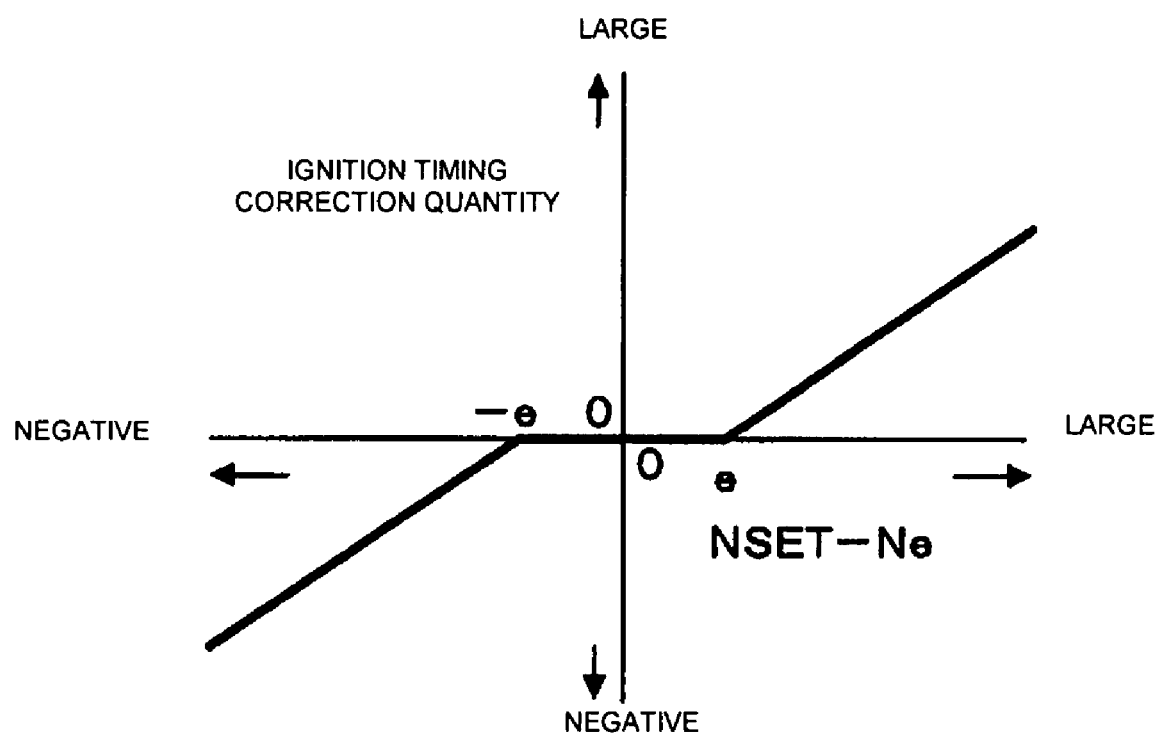
FIG. 20 is a graph diagrammatically showing an ignition timing correction quantity in the seventh embodiment.

As shown in FIG. 20, the ignition-timing correction quantity is negative when the engine rotation speed Ne is less than a value of the result of subtracting the predetermined value "e" from the target rotation speed NSET. When the engine rotation speed Ne is less than a value of the result of subtracting the predetermined value "e" from the target rotation speed NSET, the ignition timing command value ADV (ignition timing for catalyst warming-up) is corrected by the ignition-timing correction quantity to the advance angle side to increase the engine rotation speed Ne to the target rotation speed NSET. The ignition-timing correction quantity is negative when the engine rotation speed Ne is greater than a value of the result of adding the predetermined value "e" to the target rotation speed NSET. When the engine rotation speed Ne is greater than the value of the result of adding the predetermined value "e" to the target rotation speed NSET, the ignition timing command value (ignition timing for catalyst warming-up) is corrected to the retard angle side by the ignition-timing correction quantity in order to decrease the engine rotation speed Ne to the target rotation speed NSET.

In steps S81 to S83, a rotation speed deviation from the target rotation speed NSET (NSET−Ne) at the time of idling is detected, and the ignition timing for the catalyst warming-up according to the deviation. If required, the following correction may be used with embodiments of the present invention. A deviation of an actual intake pressure from the target intake pressure is detected, and the ignition timing for the catalyst warming-up is corrected according to the deviation (fourth line in FIG. 18).

In FIG. 18, a waveform of the intake pressure shown on the fourth line in FIG. 18, as in the sixth embodiment, settles down to the target intake pressure at time point t3 actually.

The operations and useful effects of the seventh embodiment are described below.

In addition to the effects by sixth embodiment, the following effects are produced.

As shown in FIG. 18, after the time point t2 when the engine rotation speed Ne from cranking to the target rotation speed NSET at the time of idling, the ignition timing command value ADV (ignition timing for warming-up) is further corrected according to the rotation speed deviation from the target rotation speed NSET (NSET−Ne) at the time of idling. Therefore, a stable idling rotation speed control is secured and the HC and other pollutants in the emissions are reduced.

Figure 21:
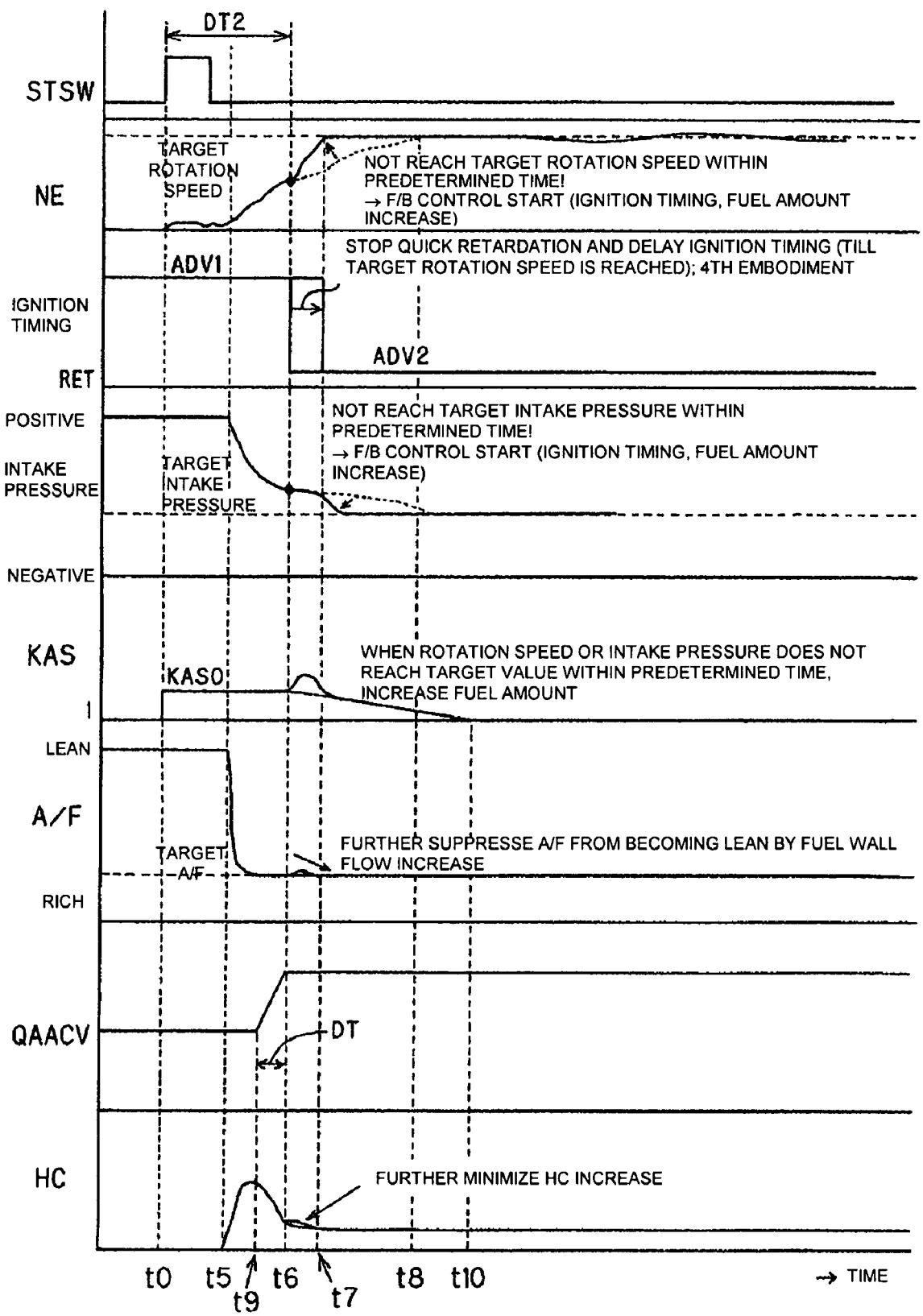
FIG. 21 is a timing chart showing operations of engine start control apparatuses according to eighth and ninth embodiments of the present invention.
Figure 22:
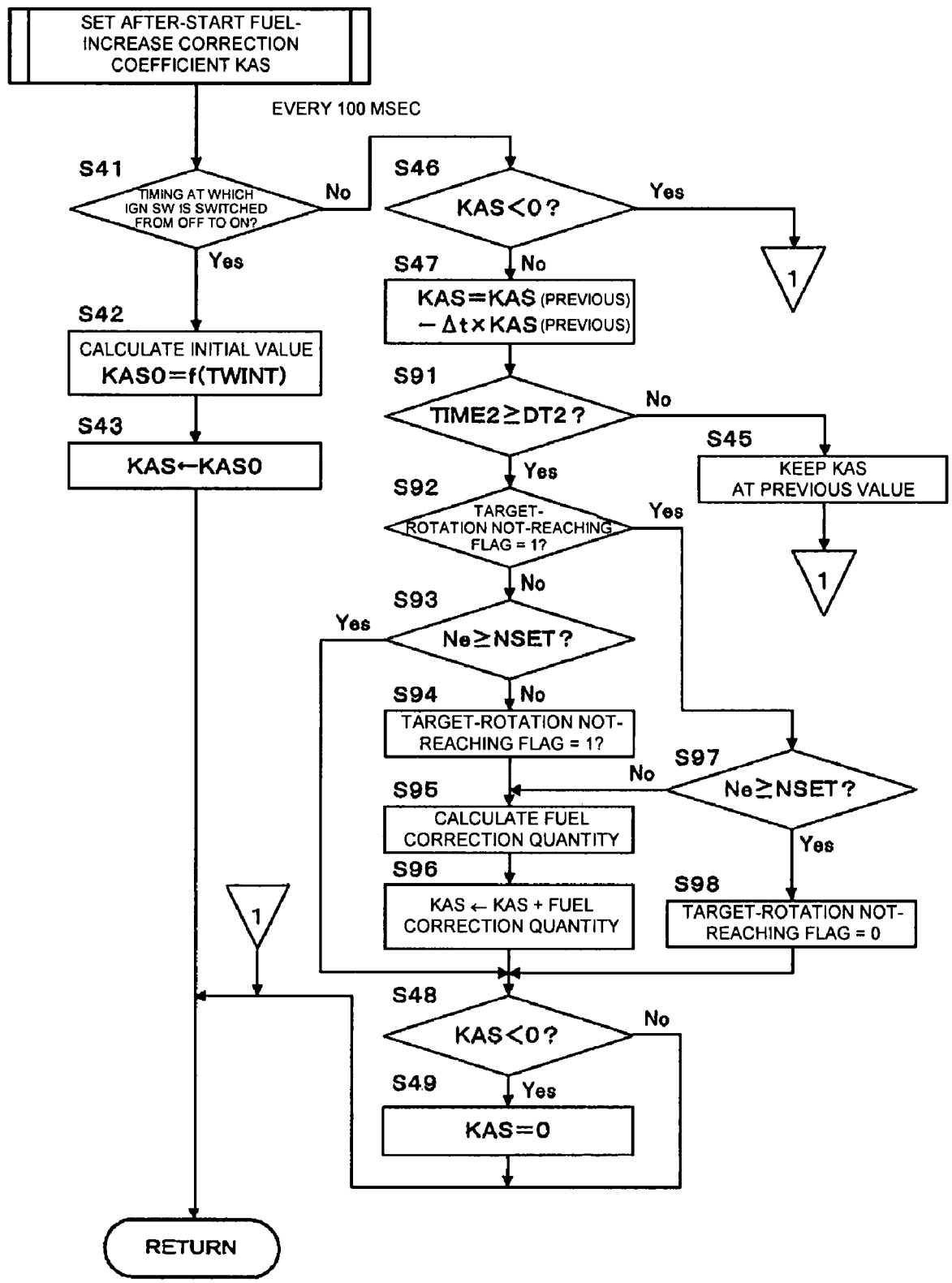
FIG. 22 is a flow chart showing calculation routines for calculating an after-start fuel-increase correction coefficient KAS, common to both the eighth and ninth embodiments.
Figure 23:
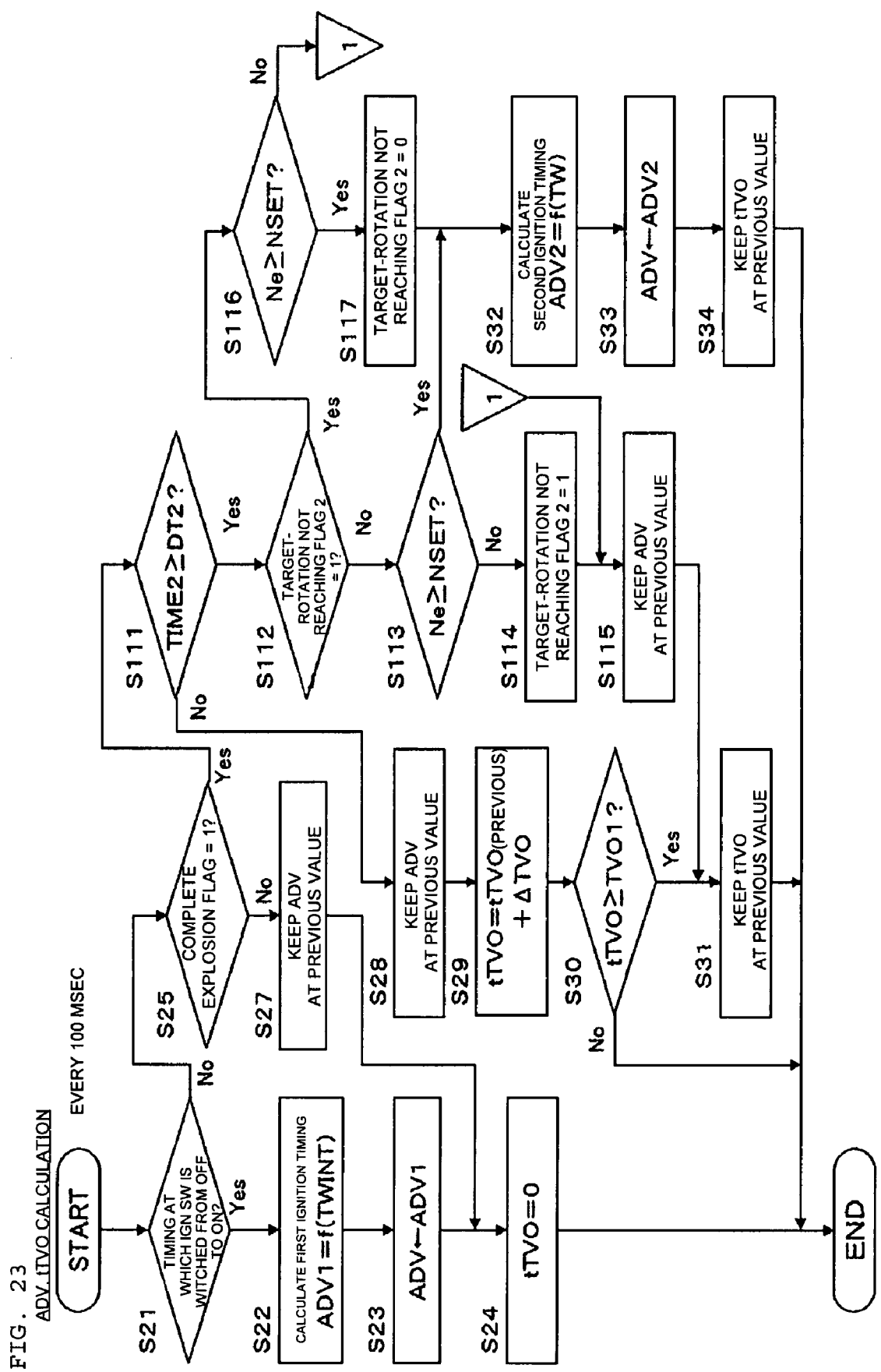
FIG. 23 is a flow chart for calculating an ignition timing command value and a throttle valve target opening-degree in the ninth embodiment.

FIG. 21 is a timing chart showing operations of engine start control apparatuses according to eighth and ninth embodiments of the present invention. FIG. 22 shows a flow chart according to the eighth embodiment, in which like portions are attached with like step numbers. FIG. 23 shows a flow chart according to the ninth embodiment, in which like portions are attached with like step numbers.

The sixth and seventh embodiments are based on condition that the engine rotation speed Ne from cranking substantially reaches the target rotation speed NSET at the time of idling at a time point when a predetermined time (first predetermined time period) elapses from the time point of the switching the starter switch 36 from off-state to on-state. The eighth and ninth embodiments are based on condition that the engine rotation speed Ne from cranking does not reach the target rotation speed NSET at the time of idling at the time point when the predetermined time (first predetermined time period) elapses from the timing of switching the starter switch 36 from the off-state to the on-state.

For example, where the first ignition timing ADV1 and the initial value KAS0 of the after-start fuel-increase correction coefficient are set for a light fuel, when the light fuel is used, the engine rotation speed Ne from cranking reaches the target rotation speed NSET at the time of idling at the time point when the predetermined time (first predetermined time period) elapses from the timing of switching the starter switch 36 from off-state to on-state. In other words, the time point when the predetermined time (first predetermined time period) elapses from the timing of switching the starter switch 36 from the off-state to the on-state is coincident with the time point when the engine rotation speed Ne from cranking reaches the target rotation speed NSET at the time of idling.

When a heavy fuel is used, a combustion state deteriorates by a difference in the nature of the light fuel and the heavy fuel. The engine rotation speed Ne from cranking does not reach the target rotation speed NSET at the time of idling at the time point t6 when the predetermined time (first predetermined time period) elapses from the time point t0 of switching the starter switch 36 from the off-state to the on-state as shown in FIG. 21. At time point t8 greatly retarded, the engine rotation speed reaches the target rotation speed NSET (see a broken line on the second line in FIG. 21). In other words, the time point t8 when the engine rotation speed Ne from cranking reaches the target rotation speed NSET is greatly retarded from the time point t6 when the predetermined time (first predetermined time period) elapses from the time point t0 of switching the starter switch 36 from the off-state to the on-state.

Delaying the start of increasing the engine rotation speed Ne from cranking is not the only result from differences in fuel. The engine rotation speed Ne from cranking also does not reach the target rotation speed NSET at the time of idling at the time point t6 when the predetermined time (first predetermined time period) elapses from the time point t0 of switching the starter switch 36 from the off-state to the on-state.

In the eighth embodiment, as shown in FIG. 21, at the time point t6 when a predetermined time DT2 (first predetermined time period) elapses from the timing of switching the starter switch 36 from the off-state to the on-state, the ignition timing is stepwise retarded from the first ignition timing ADV1 (ignition timing for start) to a second ignition timing ADV2 (ignition timing for catalyst warming-up) (third line in FIG. 21). The intake throttle 51a starts to open earlier than a time point t9 by a second predetermined time period (DT), than the time point t6 when a predetermined time DT2 elapses from the time point t0 of switching the starter switch 36 from the off-state to the on-state so that the intake air amount necessary for keeping the engine rotation speed Ne at the target rotation speed NSET is supplied to the combustion chamber at the time of idling at the time point t6 when a predetermined time DT2 elapses from the timing of switching the starter switch 36 from the off-state to the on-state (seventh line in FIG. 14). After the predetermined time DT2 elapses from the switching timing t0 of the starter switch 36 from the on-state to the off-state, during a period from the timing t9 at which the intake throttle 51a starts to open to a time point t10 when the varying intake pressure (or intake flow velocity of the intake port) settles down, the after-start fuel-increase correction coefficient KAS (fuel injection amount from the fuel injection valve 52) is temporarily increased (fifth line in FIG. 21). When the engine rotation speed Ne from cranking does not reach the target rotation speed NSET at the time of idling at timing t6 at which the predetermined time DT2 has elapsed from the switching timing t0 of the starter switch 36 from the on-state to the off-state, the after-start fuel-increase correction coefficient KAS (fuel injection amount) is increased for correction (fifth line in FIG. 21). The fuel-amount increase correction is stopped at timing t7 at which the engine rotation speed Ne reaches the target rotation speed NSET as the result of performing the increasing operation (second and fifth lines in FIG. 21).

In the ninth embodiment, when the engine rotation speed Ne from cranking does not reach the target rotation speed NSET at time point t6 at which the predetermined time DT2 has elapsed from the switching timing of the starter switch 36 from the off-state to the on-state, the after-start fuel-increase correction coefficient KAS (fuel injection amount from the fuel injection valve 52) is increased for correction (fifth line in FIG. 21), and a timing at which the ignition timing is stepwise retarded toward the second ignition timing ADV2 (ignition timing for accelerating the catalyst warming-up) is retard-angle corrected (third line in FIG. 21). The fuel-amount increase correction and the ignition timing correction are stopped at timing t7 when the engine rotation speed Ne reaches the target rotation speed NSET at the time of idling as the result of executing the fuel-amount increase correction and the ignition timing correction (second, third and fifth lines in FIG. 21).

FIG. 22 shows a flow chart for calculating the fuel-amount correction coefficient that is common to the eighth and ninth embodiments.

In FIG. 22, in step S47, the controller calculates the after-start fuel-increase correction coefficient KAS, and in step S91, the controller compares a timer 2 value TIME2 and the predetermined value DT2.

Figure 24:
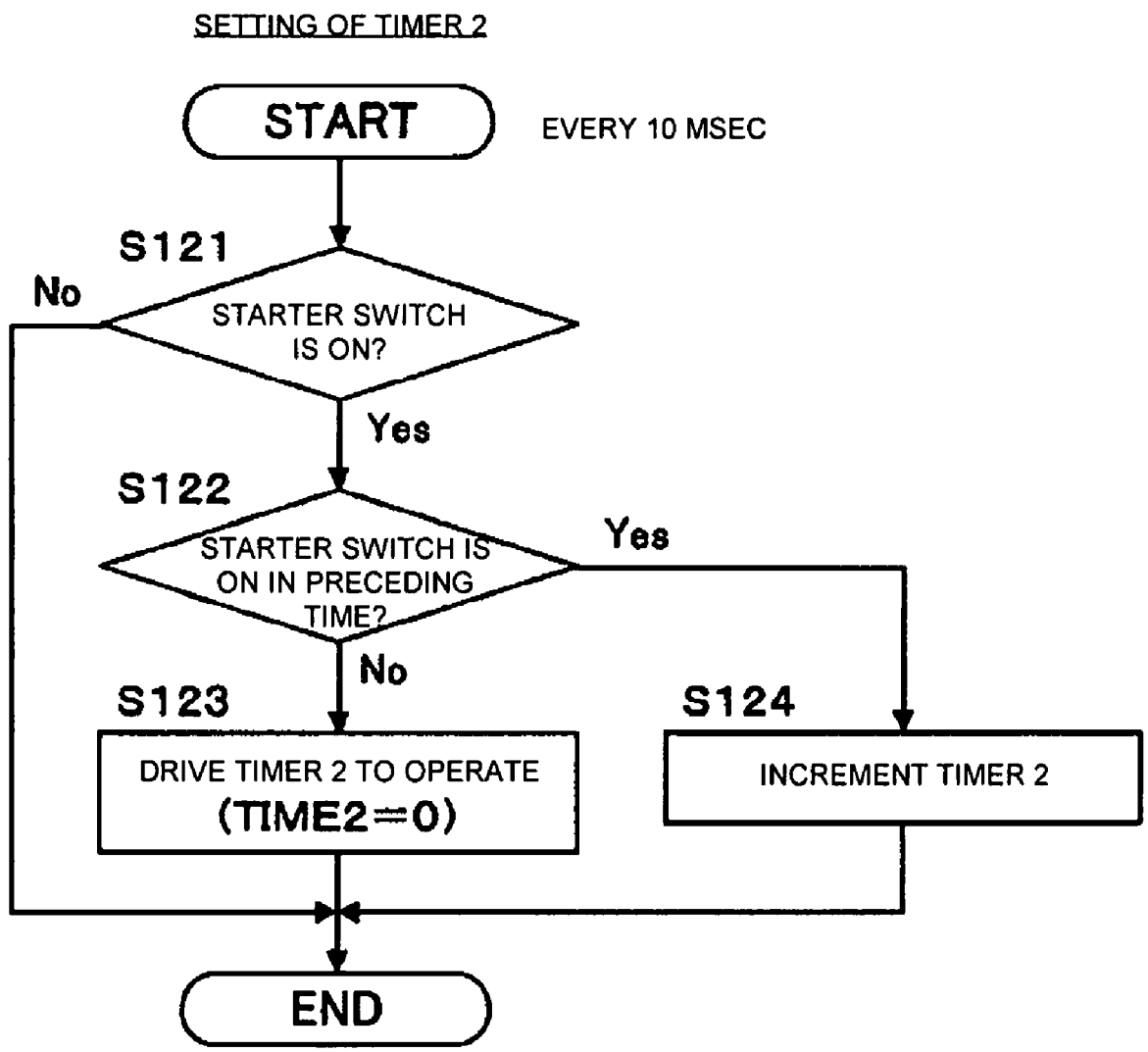
FIG. 24 is a flow chart for explaining how to set a timer-2 value in the eighth and ninth embodiments.

The timer 2 value TIME2 is a time elapsing from the timing of switching the starter switch from the off-state to the on-state. The setting of the timer 2 value TIME2 will be described with reference to a flow chart of FIG. 24. In FIG. 24, in steps S1121 and S122, the controller checks whether the starter switch 36 is currently in the on-state and whether the starter switch 36 was previously in the on-state. When the starter switch 36 is currently in the on-state and the preceding starter switch 36 was previously in the on-state, that is, the starter switch 36 is switched from the off-state to the on-state in current time, the starter switch 36 is switched this time from the off-state to the on-state, the controller advances to step S123 and the controller goes to step S123 to drive the timer 2 (timer value TIME2=0). When the current starter switch 36 is currently in the on-state in current time and the starter switch 36 was in the on-state in preceding time, that is, the starter switch 36 is switched from off-state to on-state, the controller advances from steps S121 and S122 to step S124 where the controller increments the timer 2 value TIME2 by the control period (e.g., 10 ms). With such a configuration, the timer value TIME 2 represents a time elapsing from the timing at which the starter switch is switched from the off-state to the on-state.

Returning to FIG. 22, the predetermined value DT2 is adapted in advance at time intervals each being equal to a predetermined time (first predetermined time period) elapsing from the timing at which the starter switch is switched from the off-state to the on-state (FIG. 21). Since the timer value TIME 2 is less than the predetermined value DT2 immediately after the intake air passage 2 is driven to operate, the controller advances to step S45 where it keeps the after-start fuel-increase correction coefficient KAS at the same value as the previous value (i.e., the initial value KAS0).

When the timer 2 value TIME2 is greater than the predetermined value DT2, the controller advances to step S92 and checks a target-rotation not-reaching flag. The target-rotation not-reaching flag is set at the time point when the starter switch is switched from the off-state to the on-state. Accordingly, the controller advances from a state of target-rotation not-reaching flag=0 to step S93 where it compares the engine rotation speed Ne with the target rotation speed NSET at the time of idling. When the timer 2 value TIME2 is greater than the predetermined value DT2, that is, when the engine rotation speed Ne reaches the target rotation speed NSET at the time of idling when the predetermined time DT2 elapses from the switching timing of the starter switch 36 from off-state to on-state, the controller recognizes that the engine rotation speed Ne smoothly increases, and passes steps S94 to S96 and jumps to steps S48 and S49, the processes of which are in turn executed by the controller.

When the engine rotation speed Ne is less than the target rotation speed NSET at the time of idling when the timer 2 value TIME2 is greater than the predetermined value DT2, the predetermined time has elapsed since the starter switch 36 was switched from the off-state to the on-state. The controller recognizes that increase of the engine rotation speed Ne is bad, and advances from step S93 to step S94 where it sets up a relation of "target-rotation not-reaching flag=1".

In step S95, the controller calculates a difference ΔNE (=NSET−Ne) between the engine rotation speed Ne and the target rotation speed NSET at the time of idling, and calculates a fuel correction quantity by retrieving a table containing the FIG. 10 contents by using the difference ΔNE. In step S96, the controller sets anew the sum of adding the fuel correction quantity to the after-start fuel-increase correction coefficient KAS as the after-start fuel-increase correction coefficient KAS.

Since target-rotation not-reaching flag=1, the controller advances steps S91 and S92, and step S97, and compares the engine rotation speed Ne with the target rotation speed NSET at the time of idling. If the engine rotation speed Ne is less than the target rotation speed NSET at the time of idling, the controller carries out the processes of steps S95 and S96. If the engine rotation speed Ne is still less than the target rotation speed NSET at the time of idling in the subsequent cycle of the control, the controller repeats the execution of the processes of the steps S95 and S96. If the combustion state is enhanced through the fuel-amount increase correction for the after-start fuel-increase correction coefficient KAS (fuel injection amount) in the steps S95 and S96, the increasing operation of the engine rotation speed Ne will be better. Finally, the engine rotation speed Ne reaches the target rotation speed NSET at the time of idling. At this time, the controller advances from step S97 to step S98 to carry out the fuel-amount increase correction for the after-start fuel-increase correction coefficient KAS (fuel injection amount). The controller sets up a relation of "target-rotation not-reaching flag=0", and then executes the processes of steps S48 and S49.

When in the steps S91 to S96, steps S91, S92, s97, S95, and S96, and steps S91, S92, S97 and S98, the engine rotation speed Ne from cranking does not reach the target rotation speed NSET at the time of idling the starter switch was switched from the off-state to the on-state, the after-start fuel-increase correction coefficient KAS is corrected for fuel-amount increase. When the engine rotation speed Ne reaches the target rotation speed NSET as the result of executing the fuel-amount increase correction, the fuel-amount increase correction is stopped. When the intake pressure from cranking does not reach the target intake pressure after the predetermined time DT2 elapses from the timing of switching of the starter switch from off-step to on-step, the after-start fuel-amount increase correction coefficient KAS is corrected for fuel-amount increase. When the intake pressure reaches the target intake pressure as the result of executing the fuel-amount increase correction, the increase correction is stopped (fourth line in FIG. 21).

Actually, a waveform of the intake pressure shown on the fourth line in FIG. 21 settles down to that of the target intake pressure at the timing t3.

The ninth embodiment of the invention will be described with reference to FIG. 23 showing a flow chart for calculating an ignition timing command value and a throttle valve target opening-degree.

In FIG. 23, after complete explosion flag=1, the controller advances from step S25 to step S111 where it compares the timer 2 value TIME2 with the predetermined value DT2. The values used in FIG. 22 will be applied to the timer 2 value and the predetermined value DT2. When the timer 2 value TIME2 is less than the predetermined value DT2, the controller advances to steps S28 to S31, the processes of which will be carried out.

When the timer 2 value TIME2 is greater than the predetermined value DT2, the controller advances from step S111 to step S112, and checks a target-rotation not-reaching flag 2. The target-rotation not-reaching flag 2 is set at zero the starter switch is switched from the off-state to the on-state. Accordingly, the controller advances to step S113, from a state that target-rotation not-reaching flag 2=0, and compares the engine rotation speed Ne with the target rotation speed NSET at the time of idling. Assume that the timer value TIME 2 becomes greater than the predetermined value DT2, or when the predetermined time DT2 elapses since the switching of the starter switch from the off-state to the on-state. In this case, if the engine rotation speed Ne is greater than the target rotation speed NSET at the time of idling, the controller recognizes that the increase of the engine rotation speed Ne is not bad and advances steps S32 to S34. In step S32, the controller calculates the second ignition timing ADV2 according to cooling water temperature Tw at the time when it is detected by the water temperature sensor 66. The controller sets it to the ignition timing command value ADV and keeps the throttle-valve opening degree tTVO at the same value as in preceding time.

When the engine rotation speed Ne is less than the target rotation speed NSET at the time of idling when the timer 2 value TIME2 becomes greater than the predetermined value DT2 (when the predetermined time has elapsed since the switching of the starter switch 36 from the off-state to the on-state), the controller recognizes that the increase of the engine rotation speed Ne is bad, advances from step S113 to step S114, and sets up a relation of "target-rotation not-reaching flag 2=1".

In step S115, the controller keeps the ignition timing at the same value as in preceding time, i.e., the first ignition timing ADV1 calculated when the starter switch was switched from the off-state to the on-state. When compared with the control of the sixth embodiment in which the ignition timing is stepwise switched from the first ignition timing ADV1 to the second ignition timing ADV2 when the predetermined time elapses since the switching of the starter switch from the off-state to the on-state, the control of the ninth embodiment retard-angle corrects the timing of stepwise retarding the ignition timing to the second ignition timing ADV2 (ignition timing for the catalyst warming-up acceleration).

As the result of setting up "target-rotation not-reaching flag 2=1", the controller advances from steps S111 and 112 to step S116 in subsequent time. In the step, the controller compares the engine rotation speed Ne with the target rotation speed NSET at the time of idling. If the engine rotation speed Ne is less than the target rotation speed NSET at the time of idling, the controller executes the process of step S115. If the engine rotation speed Ne is still less than the target rotation speed NSET at the time of idling, the controller repeats the execution of the process of step S115. When the combustion state is improved as the result of executing the retard-angle correction of the timing of stepwise retarding the ignition timing to the second ignition timing ADV2 (ignition timing for the catalyst warming-up acceleration), the increasing operation of the engine rotation speed Ne will be better. Finally, the engine rotation speed Ne reaches the target rotation speed NSET at the time of idling. At this time, the controller stops the retard-angle correction of the timing of stepwise retarding the ignition timing to the second ignition timing ADV2 (ignition timing for the catalyst warming-up acceleration), and advances from step S116 to step S117. The controller sets target-rotation not-reaching flag 2 at 0, and then advances to steps S32 and S33 where the controller changes the ignition timing from the first ignition timing ADV1 to the second ignition timing ADV2, and advances to step S34.

The process of FIG. 23 uses the target-rotation not-reaching flag 2, which is different from the target-rotation reaching flag used in FIG. 22. The target-rotation not-reaching flag 2 and the target-rotation reaching flag may both be used, if required.

The ignition timing correction method that is applied for a situation in which the engine rotation speed Ne from cranking does not reach the target rotation speed NSET at the time of idling at the timing t6 at which the predetermined time DT2 (first predetermined time period) has elapsed since the switching of the starter switch 36 from the off-state to the on-state, is not limited to the above-mentioned one. When the engine rotation speed Ne from cranking does not reach the target rotation speed NSET at the time of idling at the timing (t6) at which the first time DT2 (first predetermined time period) has elapsed since the switching of the starter switch 36 from the off-state to the on-state, the second ignition timing ADV2 (ignition timing for catalyst warming-up acceleration) is advance-angle corrected according to a deviation (NSET−Ne) of the engine rotation speed Ne from the target rotation speed NSET. When the engine rotation speed reaches the target rotation speed at the time of idling as the results of executing the fuel-amount increase correction for the after-start fuel-increase correction coefficient KAS (fuel injection amount) and the advance-angle correction for the second ignition timing ADV2 (ignition timing for catalyst warming-up acceleration), the fuel-amount correction and the advance-angle correction may be stopped (tenth embodiment on the second line in FIG. 25).

When the intake pressure from cranking does not reach the target intake pressure when the predetermined time DT2 elapses since the switching of the starter switch from the off-step to the on-step, the timing to stepwise retard the ignition timing to the second ignition timing ADV2 (ignition timing for catalyst warming-up acceleration) is retard-angle corrected. When the intake pressure from cranking reaches the target intake pressure as the result of executing the ignition timing correction, the ignition timing correction is stopped (fourth line in FIG. 21).

The operations and useful effects of the eighth and ninth embodiments of the invention will be described.

As shown in FIG. 21, in the eighth embodiment, even when the increase of the engine rotation speed Ne from cranking is bad owing to fuel nature difference, for example, the engine rotation speed is made to quickly reach the target rotation speed NSET (solid line on the second line in FIG. 21), and hence, the startability of the engine is stabilized. Accordingly, increase of emissions containing HC and the like after the predetermined time DT2 elapsing from the timing of switching of the starter switch 36 from off-step to on-step is minimized, and the air fuel ratio is made flat in graphic profile (sixth and bottom lines in FIG. 21).

As shown in FIG. 21, the ninth embodiment has useful effects comparable with those of the eighth embodiment.

Figure 25:
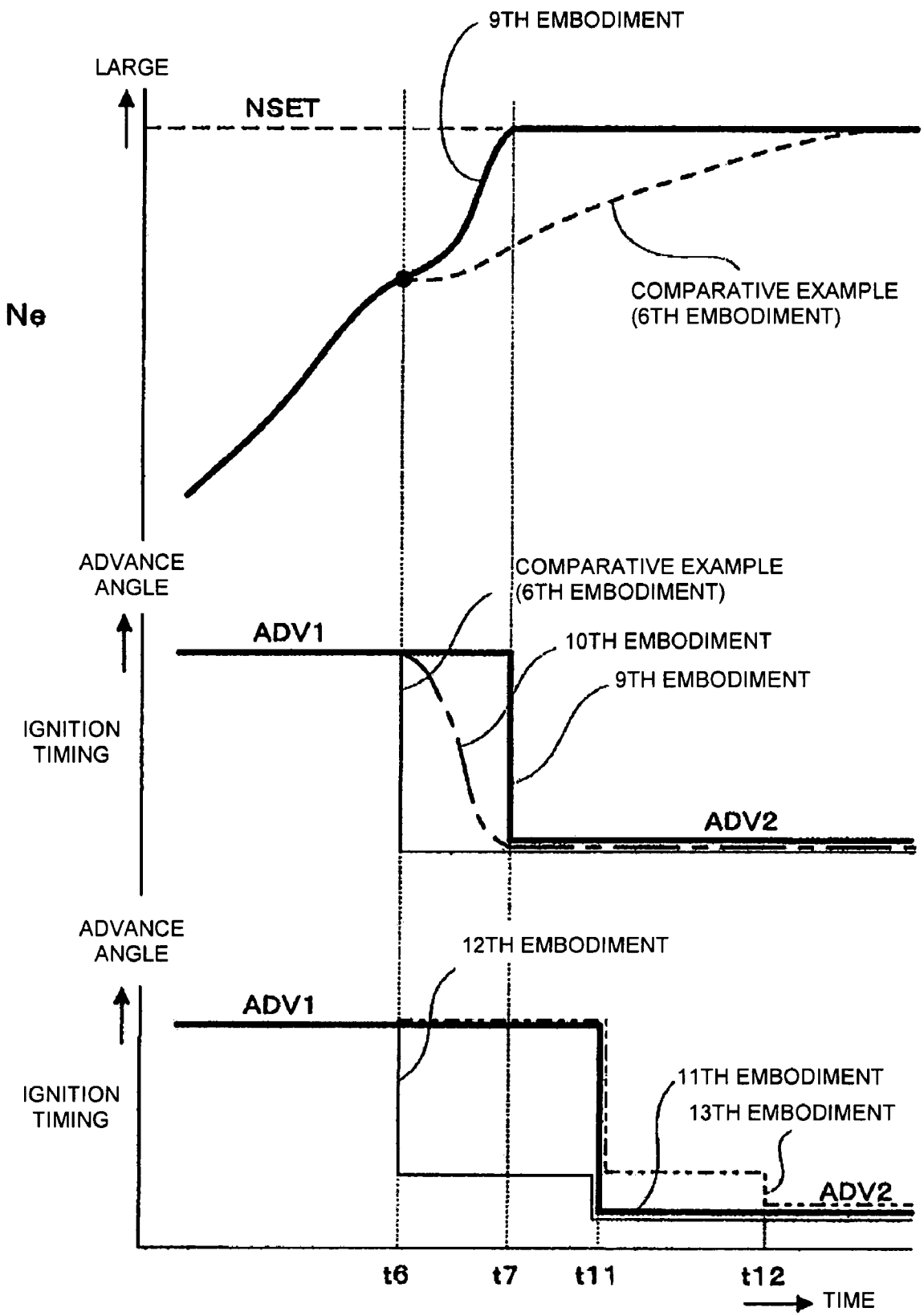
FIG. 25 is a timing chart comparatively showing operations of the engine start control apparatuses of the sixth and ninth to thirteenth embodiments of the invention.

As shown in FIG. 25, in addition to the ninth and tenth embodiments, the retard-angle correction for stepwise retarding the ignition timing to the ignition timing for catalyst warming-up acceleration and the advance-angle correction for the ignition timing catalyst warming-up acceleration may be stopped at timing t11, t12 when a fixed time has elapsed from timing t7 at which the engine rotation speed Ne from idling reaches the target rotation speed NSET at the time of idling. Also in this case, useful effects comparable with those of the other embodiments are produced (FIG. 25, eleventh, twelfth, and thirteenth embodiments).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An engine start control apparatus comprising an intake air amount control device for controlling an amount of air supplied to a combustion chamber, a fuel supply device for injecting fuel to be fed into the combustion chamber, and an igniting device for igniting the fuel, the engine start control apparatus comprising:
   an engine operation state detecting unit for detecting an operation state of the engine;
   an ignition timing retard angle processing unit for operating the igniting device configured to retard an ignition timing from a start ignition timing to an ignition timing for catalyst warming-up acceleration in response to detection that the engine operation state has shifted to an idling operation state;
   an intake control device operation unit for operating the intake air amount control device so as to supply such an amount of intake air as to keep the idling operation state when the engine operation state has shifted to the idling operation state; and
   an injection fuel amount increasing unit for increasing an amount of fuel injected into a cylinder to be shifted to a combustion stroke so as to be combusted in the combustion stroke when the engine operation state has shifted to the idling operation state.

2. The engine start control apparatus according to claim 1, wherein the engine operation state detecting unit detects an engine rotation speed,
   wherein, at the start of the engine, the ignition timing retard angle processing unit retards the ignition timing when the engine rotation speed reaches a target idling rotation speed, and
   wherein the injection fuel amount increasing unit increases the amount of fuel to be injected into a cylinder expected to be in the combustion stroke when the engine rotation speed at start reaches the target idling rotation speed and in an exhaust stroke just before the engine rotation speed reaches the target idling rotation speed.

3. The engine start control apparatus according to claim 2, wherein the intake control device is a throttle valve disposed in an intake passage of the engine, and
   wherein the intake control device operation unit operates the throttle valve before the ignition timing is retarded, and wherein the intake control device operation unit is configured to allow a response delay period from the instance that the throttle valve opens until air reaches the combustion chamber of the engine.

4. The engine start control apparatus according to claim 3, wherein the fuel supply device is provided in an intake passage of the engine,
   wherein the injection fuel amount increasing unit increases fuel to be injected into a cylinder expected to be in the exhaust stroke when a predetermined expected engine rotation speed reaches a reference rotation speed, wherein the predetermined expected engine rotation speed is an expected engine rotation speed of a cylinder when the cylinder is in the combustion stroke, and wherein the expected engine rotation speed is predicted based on the response delay period from the instance that the throttle valve opens until air reaches the combustion chamber of the engine.

5. The engine start control apparatus according to claim 4, wherein the reference rotation speed is a target idling rotation speed.

6. The engine start control apparatus according to claim 4, wherein the injection fuel amount increasing unit increases fuel to be injected into a cylinder being in the exhaust stroke when the expected engine rotation speed reaches a reference rotation speed, and also to a second cylinder to be ignited subsequent to the ignition of the cylinder when the second cylinder is in the exhaust stroke.

7. The engine start control apparatus according to claim 1, wherein the engine operation state detecting unit detects an engine rotation speed,
   wherein the fuel supply device is provided in an intake passage of the engine,
   wherein the intake control device is a throttle valve provided in the intake passage of the engine,
   wherein, at the start of the engine, the ignition timing retard angle processing unit retards, an ignition timing of the cylinder when an engine rotation speed reaches a target idling rotation speed,
   wherein the intake control device operation unit operates the throttle valve before the ignition timing is retarded, and wherein the intake control device operation unit is configured to allow a response delay period from the instance that the throttle valve opens until air reaches the combustion chamber of the engine, and
   wherein the injection fuel amount increasing unit interruptively injects fuel into a cylinder expected to be in the intake stroke when the engine rotation speed reaches a target idling rotation speed and in an intake stroke just before the engine rotation speed reaches the target idling rotation speed.

8. The engine start control apparatus according to claim 7, wherein the injection fuel amount increasing unit interruptively injects fuel into a cylinder expected to be in the intake stroke when a predetermined expected engine rotation speed reaches a reference rotation speed, and the predetermined expected engine rotation speed is an expected engine rotation speed of a cylinder when the cylinder is in the combustion stroke, wherein the expected engine rotation speed is predicted based on the response delay period from the instance that the throttle valve opens until air reaches the combustion chamber of the engine.

9. The engine start control apparatus according to claim 8, wherein the reference rotation speed is a target idling rotation speed.

10. The engine start control apparatus according to claim 9, wherein the injection fuel amount increasing unit interruptively injects fuel into a cylinder expected to be in the intake stroke when the expected engine rotation speed reaches the reference rotation speed, and also increases fuel to be injected into a second cylinder to be ignited subsequent to the ignition of the cylinder when the second cylinder is in the exhaust stroke and interruptively injects fuel to the second cylinder when the second cylinder is in the intake stroke.

11. The engine start control apparatus according to claim 1, wherein the fuel supply device is provided in an intake passage of the engine,
   wherein the intake control device is a throttle valve provided in the intake passage of the engine,
   wherein the engine operation state detecting unit detects an engine rotation speed,
   wherein the injection fuel amount increasing unit temporarily increases the amount of fuel injected from a fuel injection valve during a time period from when the intake control device operation unit starts to open the throttle valve until a change of at least one of an intake pressure and an intake flow velocity in an intake port settles down after the engine rotation speed reaches a target rotation speed at the time of idling.

12. The engine start control apparatus according to claim 11, wherein a catalyst and an oxygen concentration sensor for detecting the oxygen concentration in an exhaust gas are provided in the exhaust passage of the engine, the engine start control apparatus further comprising:
   an air fuel ratio feedback control start processing unit for starting an air fuel ratio feedback control when an engine rotation speed from cranking reaches a target rotation speed at the time of idling and the oxygen concentration sensor is activated; and
   a fuel injection amount correction processing unit for detecting a deviation of the engine rotation speed from the target rotation speed after the engine rotation speed reaches the target rotation speed and for correcting the injection fuel amount according to the detected deviation of the engine rotation speed from the target rotation speed.

13. The engine start control apparatus according to claim 1, wherein the fuel supply device is provided in an intake passage of the engine,
   wherein the intake control device is a throttle valve provided in the intake passage of the engine,
   wherein the engine operation state detecting unit detects an intake pressure,
   wherein the ignition timing retard angle processing unit stepwise retards the ignition timing from a start ignition timing to an ignition timing for catalyst warming-up acceleration when an intake pressure from cranking reaches a target intake pressure at the time of idling, and starts to open the throttle valve a predetermined time period before the intake pressure reaches the target intake pressure at the time of idling so as to supply an intake air amount necessary for keeping the intake pressure at the target intake pressure, and
   the injection fuel amount increasing unit temporarily increases the amount of fuel injected from a fuel injection valve during a time period from when the intake control device operation unit starts to open the throttle valve until a change of at least one of an intake pressure and an intake flow velocity in an intake port settles down after the intake pressure reaches the target intake pressure at the time of idling, detects a deviation of the intake pressure from the target intake pressure after the intake pressure reaches the target intake pressure, and corrects the injection fuel amount according to the detected deviation of the intake pressure from the target intake pressure.

14. The engine start control apparatus according to claim 1, wherein a catalyst and an oxygen concentration sensor for detecting the oxygen concentration in an exhaust gas are provided in an exhaust passage of the engine
   wherein the fuel supply device is provided in the intake passage of the engine,
   wherein the intake control device is a throttle valve provided in the intake passage of the engine,
   wherein the engine operation state detecting unit detects an engine rotation speed,
   wherein the ignition timing retard angle processing unit stepwise retards the ignition timing from a start ignition timing to an ignition timing for catalyst warming-up acceleration when a first predetermined time period has elapsed since a starter switch was switched from an off-state to an on-state,
   wherein the intake control device operation unit starts to open the throttle valve a second predetermined time period before the first predetermined time period has elapsed since the starter switch was switched from the off-state to the on-state so as supply to the combustion engine an intake air amount necessary for keeping the engine rotation speed at the target rotation speed at the time of idling, and
   wherein the injection fuel amount increasing unit temporarily increases the amount of fuel injected from a fuel injection valve during a time period from when the throttle valve starts to open until a change of at least one of an intake pressure and an intake flow velocity in an intake port settles down after the first predetermined time period lapses the starter switch was switched from the off-state to the on-state, and further increases the injection fuel amount when the engine rotation speed from cranking does not yet reach the target rotation speed at the time of idling when the first predetermined time period has elapsed since the starter switch was switched from the off-state to the on-state, and stops the fuel-amount increase correction when the engine rotation speed reaches the target rotation speed.

15. The engine start control apparatus according to claim 14, further comprising:
   an injection-fuel increase correction/ignition timing correction processing unit which further increases the injection fuel amount when the engine rotation speed from cranking does not yet reach the target rotation speed at the time of idling when the first predetermined time period has elapsed since the starter switch was switched from the off-state to the on-state, and corrects when the ignition timing is stepwise retarded in the ignition timing retard angle processing unit; and
   a fuel-amount increase correction/ignition timing correction stop processing unit which stops the fuel-amount correction and the ignition timing correction when the engine rotation speed reaches the target rotation speed at the time of idling.

16. The engine start control apparatus according to claim 1, wherein a catalyst and an oxygen concentration sensor for detecting the oxygen concentration in an exhaust gas are provided in an exhaust passage of the engine,
   wherein the fuel supply device is provided in the intake passage of the engine,
   wherein the intake control device is a throttle valve provided in the intake passage of the engine, and
   wherein the engine operation state detecting unit detects an engine rotation speed, the engine start control apparatus further comprising:
   an ignition timing retard-angle processing procedure for stepwise retarding an ignition timing from a start ignition timing to an ignition timing for catalyst warming-up acceleration when a first predetermined time period has elapsed since a starter switch was switched from an off-state to an on-state;
   an intake control device operation procedure for starting to open the throttle valve by a second predetermined time period before the first predetermined time period has elapsed since the starter switch was switched from the off-state to the on-state so as to supply to the combustion chamber an intake air amount necessary for keeping an intake pressure at a target intake pressure;
   an injection fuel amount increasing procedure for temporarily increasing the amount of fuel injected from a fuel injection valve during a time period from when the throttle valve starts to open until a change of at least one of an intake pressure and an intake flow velocity in an intake port settles down after the first predetermined time period lapses the starter switch was switched from the off-state to the on-state;

an injection fuel amount increasing procedure for further increasing the injection fuel amount when the intake pressure from cranking does not yet reach the target intake pressure at the time of idling when the first predetermined time period has elapsed since the starter switch was switched from the off-state to the on-state; and a fuel-amount increase correction stop processing procedure for stopping the fuel-amount increase correction when the intake pressure from cranking reaches the target intake pressure.

17. The engine start control apparatus according to claim 16, further comprising:

an injection-fuel increase correction/ignition timing correction processing procedure for further increasing the injection fuel amount when the intake pressure from cranking does not yet reach the target intake pressure at the time of idling at the time of idling when the first predetermined time period has elapsed since the starter switch was switched from the off-state to the on-state, and for correcting when the ignition timing is stepwise retarded in the ignition timing retard angle processing procedure; and a fuel-amount increase correction/ignition timing correction stop processing procedure for stopping the fuel-amount correction and the ignition timing correction when the intake pressure reaches the target intake pressure at the time of idling.

18. An engine start control method comprising:

retarding an ignition timing when an engine rotation speed at start of the engine reaches a target idling rotation speed;

opening an intake throttle before the retarding of the ignition timing by a response delay period from when an intake throttle opens until air reaches a combustion chamber of the engine; and increasing an amount of fuel injected into a cylinder expected to be in a combustion stroke when the start engine rotation speed reaches the target idling rotation speed, and in the exhaust stroke immediately before the start engine rotation speed reaches the target idling rotation speed.

19. The engine start control method according to claim 18, further comprising:

obtaining an expected engine rotation speed before the response delay period from when the intake throttle opens until air reaches the combustion chamber of the engine; and increasing the amount of fuel injected into a cylinder being in the exhaust stroke when the expected engine rotation speed reaches a reference rotation speed.

20. The engine start control method according to claim 18, wherein the reference rotation speed is the target idling rotation speed.

21. The engine start control method according to claim 18, wherein the reference rotation speed represents a decision value for determining a cylinder preceding by one, in the ignition timing order, to the cylinder expected to be in the combustion stroke when the engine rotation speed at start of the engine reaches the target idling rotation speed.

22. The engine start control method according to claim 18, further comprising:

detecting an engine rotation speed; and temporarily increasing the amount of fuel injected during a time period from when the intake throttle starts to open until a change of at least one of an intake pressure and an intake flow velocity in an intake port settles down after the engine rotation speed reaches a target rotation speed at the time of idling.

23. The engine start control method according to claim 18, further comprising:

detecting an intake pressure;

stepwise retarding the ignition timing from a start ignition timing to an ignition timing for catalyst warming-up acceleration when an intake pressure from cranking reaches a target intake pressure at the time of idling;

starting to open the throttle valve a predetermined time period before the intake pressure reaches the target intake pressure at the time of idling so as to supply an intake air amount necessary for keeping the intake pressure at the target intake pressure;

temporarily increasing the amount of fuel injected during a time period from when the intake throttle starts to open until a change of at least one of an intake pressure and an intake flow velocity in an intake port settles down after the engine rotation speed reaches a target rotation speed at the time of idling;

detecting a deviation of the intake pressure from the target intake pressure after the intake pressure reaches the target intake pressure; and correcting the injection fuel amount according to the detected deviation of the intake pressure from the target intake pressure.

24. The engine start control method according to claim 18, further comprising:

wherein a catalyst and an oxygen concentration sensor for detecting the oxygen concentration in an exhaust gas are provided in an exhaust passage of the engine, wherein the fuel supply device is provided in the intake passage of the engine, wherein the intake control device is a throttle valve provided in the intake passage of the engine, and detecting an engine rotation speed, stepwise retarding an ignition timing from a start ignition timing to an ignition timing for catalyst warming-up acceleration when a first predetermined time period has elapsed since a starter switch was switched from an off-state to an on-state;

starting to open the throttle valve by a second predetermined time period before the first predetermined time period has elapsed since the starter switch was switched from the off-state to the on-state so as to supply to the combustion chamber an intake air amount necessary for keeping an intake pressure at a target intake pressure;

temporarily increasing the amount of fuel injected from a fuel injection valve during a time period from when the throttle valve starts to open until a change of at least one of an intake pressure and an intake flow velocity in an intake port settles down after the first predetermined time period lapses the starter switch was switched from the off-state to the on-state;

increasing the injection fuel amount when the intake pressure from cranking does not yet reach the target intake pressure at the time of idling when the first predetermined time period has elapsed since the starter switch was switched from the off-state to the on-state; and stopping the fuel-amount increase correction when the intake pressure from cranking reaches the target intake pressure.

25. An engine start control apparatus comprising an intake air amount control device for controlling an amount of air supplied to a combustion chamber, a fuel supply device for injecting fuel to be fed into the combustion chamber, and an igniting device for igniting the fuel, the engine start control apparatus comprising:

detecting means for detecting an operation state of the engine;

ignition timing means for retarding an ignition timing from a start ignition timing to an ignition timing for catalyst warming-up acceleration in response to detection that the engine operation state has shifted to an idling operation state;

intake control means for operating the intake air amount control device so as to supply such an amount of intake air as to keep the idling operation state when the engine operation state has shifted to the idling operation state; and injection fuel amount increasing means for increasing an amount of fuel injected into a cylinder, to be shifted in operation to a combustion stroke so as to be combusted in the combustion stroke when the engine operation state has shifted to the idling operation state.

* * * * *